(12) United States Patent
Shishido

(10) Patent No.: US 11,920,698 B2
(45) Date of Patent: Mar. 5, 2024

(54) FLOW CONTROL VALVE

(71) Applicant: SMC CORPORATION, Tokyo (JP)

(72) Inventor: Kenji Shishido, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 40 days.

(21) Appl. No.: 17/657,368

(22) Filed: Mar. 31, 2022

(65) Prior Publication Data

US 2022/0325821 A1   Oct. 13, 2022

(30) Foreign Application Priority Data

Apr. 12, 2021   (JP) ................................ 2021-067027

(51) Int. Cl.
| | | |
|---|---|---|
| *F16K 37/00* | (2006.01) | |
| *F16K 31/524* | (2006.01) | |
| *F16K 31/60* | (2006.01) | |
| *F16K 35/02* | (2006.01) | |

(52) U.S. Cl.
CPC .... *F16K 37/0016* (2013.01); *F16K 31/52408* (2013.01); *F16K 31/60* (2013.01); *F16K 35/027* (2013.01)

(58) Field of Classification Search
None
See application file for complete search history.

(56) References Cited

U.S. PATENT DOCUMENTS

| | | | | |
|---|---|---|---|---|
| 4,157,786 A | * | 6/1979 | Bergquist | ................ F23N 5/067 |
| | | | | 251/96 |
| 5,037,066 A | * | 8/1991 | Kerger | .................. F16K 35/027 |
| | | | | 74/25 |
| 5,769,118 A | | 6/1998 | Lénberg | |
| 8,726,933 B2 | * | 5/2014 | Chen | ..................... F16K 17/048 |
| | | | | 137/557 |
| 8,833,535 B2 | * | 9/2014 | Saito | ........................ G01B 3/18 |
| | | | | 192/114 R |
| 9,523,444 B2 | | 12/2016 | Shishido | |

FOREIGN PATENT DOCUMENTS

| | | |
|---|---|---|
| JP | 6179510 B2 | 8/2017 |
| KR | 10-1986232 B1 | 6/2019 |

OTHER PUBLICATIONS

Extended European Search Report dated Sep. 20, 2022 in European Application No. 22167025.0, 5 pages.

* cited by examiner

*Primary Examiner* — Angelisa L. Hicks
(74) *Attorney, Agent, or Firm* — Oblon, McClelland, Maier & Neustadt, L.L.P.

(57) ABSTRACT

A flow control valve adjusts an opening degree of a second channel by moving a needle valve in a first axis direction in accordance with a rotating operation amount of a knob provided at the first body, and includes a scale body, and a scale reading part that indicates the scale mark corresponding to the rotating operation amount of the knob, and a clutch mechanism that changes the scale mark of the scale body when the knob is rotated. The clutch mechanism includes an engaging portion, an engaged portion, and a clutch drive mechanism, and the scale reading part and the scale body rotate integrally when the engaging portion and the engaged portion are engaged. The clutch drive mechanism releases engagement between the engaging portion and the engaged portion when the knob is rotated and, after the scale mark is changed, re-engages the engaging portion with the engaged portion.

9 Claims, 17 Drawing Sheets

FLOW CONTROL VALVE

TECHNICAL FIELD

The present invention relates to a flow control valve that controls the flow rate of fluid flowing through a channel by adjusting the opening degree of the channel, formed in a valve body, with a needle valve interlocked with the rotating operation of a knob and particularly relates to the one capable of indicating the rotating operation amount of the knob, that is, the opening degree of the channel with the needle valve.

BACKGROUND ART

A flow control valve is a small device that controls the speed of an actuator by limiting the flow of fluid and is used in, for example, an automatic equipment line that assembles machinery equipment, electronic equipment, or the like. Some flow control valves include a needle valve that adjusts the opening degree of a channel, a rotary knob interlocked with the needle valve, and an indicator that indicates the opening degree of the channel with the needle valve, that is, the rotating operation amount of the knob, as described in, for example, PTL 1.

The flow control valve described in PTL 1 includes a housing extending in an axial direction and formed in a cylindrical shape, a cylindrical casing attached to one-side (upper side) end of the housing in the axial direction, and a closed-top cylindrical knob provided on the upper side of the casing so as to be rotatable around the axis. The needle valve is provided inside the housing so as to be movable in the axial direction and rotatable around the axis. The upper part of the needle valve is disposed in the casing and inserted in a shaft portion extending in the axial direction, and the needle valve and the shaft portion are fitted so as to be fixed to each other around the axis and movable relative to each other in the axial direction. A hole portion extending downward in the axial direction is provided at the center part of the knob, and the shaft portion extending from the upper part of the casing is inserted in the hole portion in a state of being fixed to each other around the axis. In other words, when the knob is rotated, the shaft portion and the needle valve are able to be rotated integrally.

In addition, a cylindrical needle guide disposed at the lower side of the shaft portion is provided in the housing, and an internal thread provided on the inner surface of the needle guide is screwed with an external thread provided on the outer periphery of the needle valve. Therefore, when the knob is rotated, the needle valve moves in the axial direction while rotating relative to the needle guide. With movement of the needle valve in the axial direction, the opening degree of the channel provided in the housing is adjusted, and the flow rate of fluid flowing through the channel is able to be controlled.

Incidentally, in the flow control valve described in PTL 1, an annular indicator ring is provided at a location eccentric radially outward of the shaft portion on the upper side in the casing, the central axis of the indicator ring extends parallel to the rotation central axis of the shaft portion. A hole portion extending through in the axial direction is provided inside the indicator ring, and internal tooth portions are recessed on the inner surface of the indicator ring, forming the hole portion, at equal intervals in a circumferential direction. The shaft portion is inserted in the hole portion of the indicator ring, a meshing portion able to mesh with the internal tooth portions is provided on the side surface of the shaft portion, the inside diameter of the hole portion of the indicator ring is formed so as to be greater than the outer diameter of the shaft portion, and the shaft portion is disposed at a location close to one side of the hole portion of the indicator ring in a radial direction. When the shaft portion rotates one revolution, the meshing portion drives out one internal tooth portion in the circumferential direction to rotate the indicator ring by a predetermined rotational angle. Furthermore, scale marks that indicate the opening degrees of the fluid channel with the needle valve (the rotating operation amount of the knob) are provided on the outer periphery of the indicator ring, an indicator window through which a scale mark can be visually recognized is open through the casing facing the outer periphery of the indicator ring.

CITATION LIST

Patent Literature

PTL 1: Japanese Patent No. 6179510

SUMMARY OF INVENTION

Technical Problem

In this way, in the flow control valve described in PTL 1, the central axis of the indicator ring is provided at a location eccentric radially outward of the shaft portion disposed coaxially with the knob and the needle valve. Therefore, the casing that accommodates the indicator ring also needs to be formed so as to swell radially outward of the shaft portion, so it is not possible to avoid an increase in the size of the casing and, by extension, an increase in the size of the overall flow control valve, structurally. On the other hand, for users, with space savings, further size reduction is also desired for such a flow control valve.

A technical challenge of the present invention is to provide a flow control valve capable of indicating the rotating operation amount of a knob, that is, the opening degree of a channel with a needle valve and able to be further reduced in size.

Solution to Problem

To solve the above problem, a flow control valve according to the present invention includes a body extending in an axial direction; a channel formed in the body; a knob disposed on one side of the body in the axial direction and supported so as to be rotatable around the axis with respect to the body; and a needle valve that is disposed coaxially with the knob in the body and that adjusts an opening degree of the channel by moving in the axial direction in accordance with a rotating operation amount of the knob, wherein the flow control valve is capable of controlling a flow rate of fluid flowing through the channel in accordance with the rotating operation amount of the knob, the flow control valve further includes a scale body supported so as to be rotatable around the axis with respect to the knob and having scale marks that indicate rotating operation amounts of the knob; a scale reading part that rotates constantly integrally with the knob around the axis and that indicates the scale mark corresponding to the rotating operation amount of the knob; a shaft portion that is disposed on the other side of the scale body in the axial direction and that rotates constantly integrally with the knob around the axis while being supported so as to be movable in the axial direction with respect to the knob; and a clutch mechanism that switches the scale mark of the scale body, indicated by the scale reading part, each time the knob is rotated by a predetermined angle by transmitting rotation of the knob to the scale body or interrupting the transmission, wherein the clutch mechanism includes an engaging portion and an engaged portion, one of which is provided on the shaft portion and the other one of which is provided on the scale body, and that rotate the scale reading part and the scale body integrally around the axis by transmitting rotation of the knob to the scale body through engagement with each other, and a clutch drive mechanism that permits the scale reading part to rotate around the axis with respect to the scale body through rotation of the knob by moving the shaft portion to the other side in the axial direction each time the knob is rotated by a predetermined angle to release engagement between the engaging portion and the engaged portion and that, after the scale mark of the scale body, indicated by the scale reading part, is changed through the rotation of the scale reading part with respect to the scale body, re-engages the engaging portion with the engaged portion.

In this case, preferably, the clutch drive mechanism includes a cam surface provided so as to be fixed to the body and extending annularly around the axis, and a cam copying projection that is provided on the shaft portion and disposed opposite the cam surface and that rotates around the axis to slide on the cam surface with rotation of the knob, the cam surface has a cam hole extending through in the axial direction, and a cam flat part extending in a planar shape from one-side end of the cam hole in the axial direction so as to face one side in the axial direction, and the clutch drive mechanism releases engagement between the engaged portion and the engaging portion by the cam copying projection moving into and engaging with the cam hole each time the knob is rotated by a predetermined angle, and permits rotation of the scale reading part around the axis with respect to the scale body through rotation of the knob. Preferably, the clutch drive mechanism includes a spring that constantly urges the shaft portion toward the other side in the axial direction, the shaft portion moves to the other side in the axial direction with movement of the cam copying projection into the cam hole under urging of the spring, and, after the scale mark of the scale body, indicated by the scale reading part, is changed, the engaged portion and the engaging portion are re-engaged by the cam copying projection moving to one side in the axial direction against the urging of the spring to contact the cam flat part.

Preferably, the scale body includes a plurality of resistance generating projections provided around the axis at intervals, the flow control valve includes a locking protrusion that slidably contacts the plurality of resistance generating projections, the locking protrusion is disposed on any one side in the axial direction with respect to the plurality of resistance generating projections and provided so as to be fixed to the body, and, in a state where engagement between the engaged portion and the engaging portion is released, co-rotation of the scale body with rotation of the knob is blocked by resistance generated when the locking protrusion contacts any one of the plurality of resistance generating projections. Further preferably, the locking protrusion has a first contact part that protrudes toward the other side in the axial direction and that slidably contacts the resistance generating projection, and the plurality of resistance generating projections extends radially outward in a radial direction at equal intervals around the axis.

Preferably, the flow control valve has a contact surface that is provided so as to be fixed to the body and that faces the other side in the axial direction, the shaft portion has a second contact part that is disposed opposite the contact surface and that is able to contact the contact surface, and the second contact part, when the cam copying portion is removed from the cam hole through rotating operation of the knob in a state where the cam copying portion is engaged with the cam hole, contacts the contact surface to block movement of the shaft portion to one side in the axial direction.

Advantageous Effects of Invention

As described above, according to the present invention, it is possible to provide a flow control valve capable of indicating the rotating operation amount of a knob, that is, the opening degree of a channel with a needle valve and able to be further reduced in size.

DESCRIPTION OF EMBODIMENTS

Figure 1:
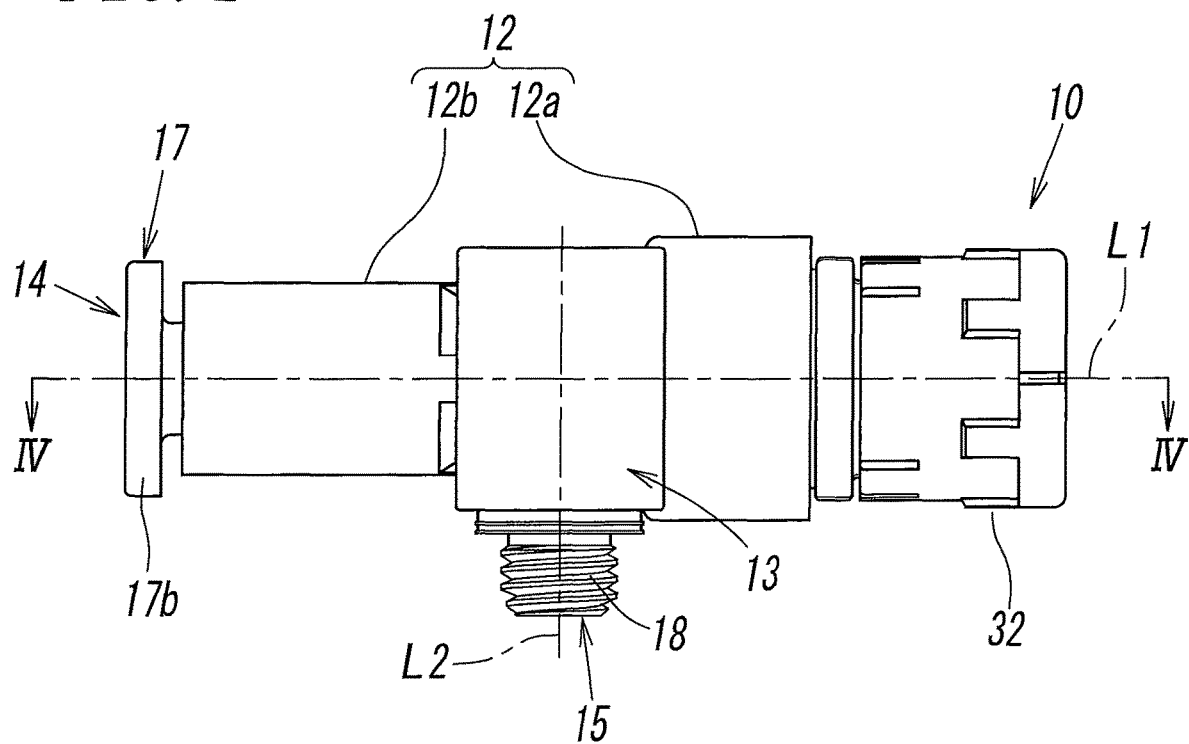
FIG. 1 is a side view showing an embodiment of a flow control valve according to the present invention.
Figure 2:
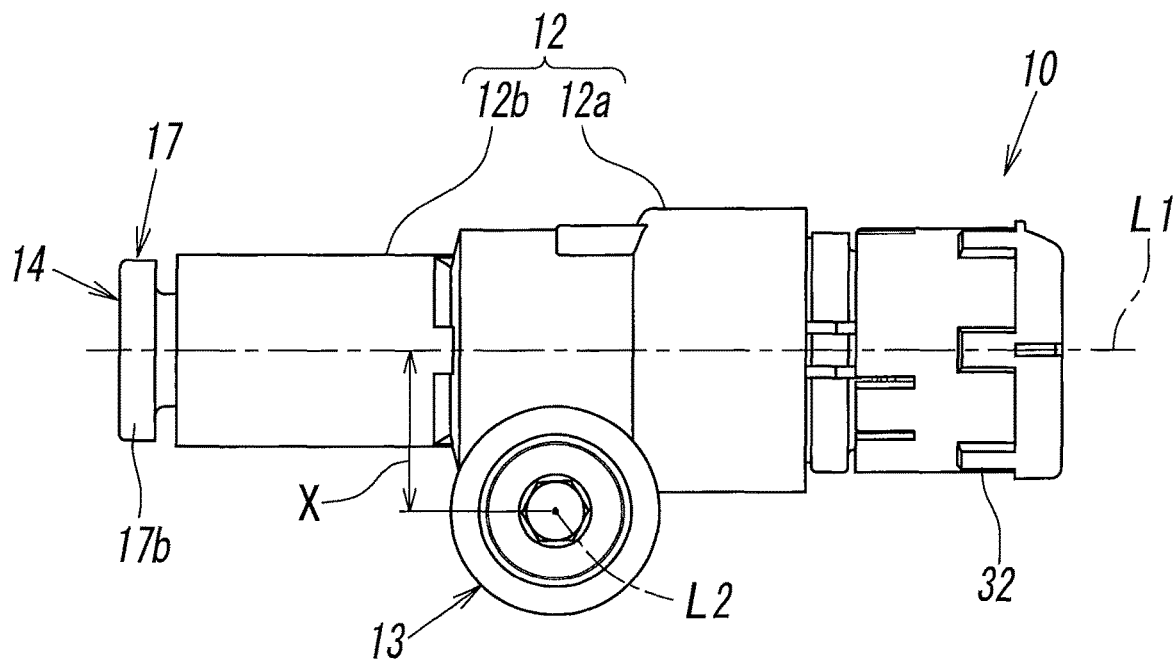
FIG. 2 is a plan view of the flow control valve shown in FIG. 1.
Figure 3:
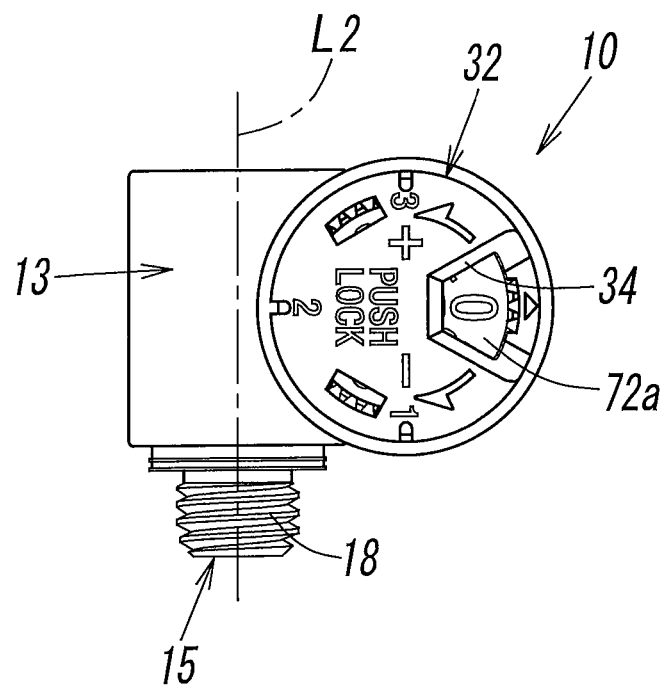
FIG. 3 is a front view of the flow control valve.

Hereinafter, a flow control valve according to an embodiment of the present invention will be described. In the present embodiment, fluid is compressed air, and a meter-out control-type speed controller that is directly attached to a fluid pressure cylinder for use and that controls the operation speed of the fluid pressure cylinder by limiting an exhaust flow rate from the fluid pressure cylinder will be described as an example of the flow control valve. However, of course, the present invention is also applicable to, for example, a meter-in control-type speed controller that controls the operation speed of a fluid pressure cylinder by limiting a supply flow rate of compressed air supplied to the fluid pressure cylinder. Of course, the flow control valve is not exclusively used in a fluid pressure cylinder and may be used in other various fluid pressure devices.

As shown in FIGS. 1 to 4, the flow control valve 10 according to the present embodiment includes a substantially cylindrical first body 12 (body) extending along a first axis L1, and a substantially cylindrical second body 13 coupled to the side surface of the first body 12 so as to extend along a second axis L2 orthogonal to the first axis L1. In other words, the first axis L1 and the second axis L2 are in a skew position.

The first body 12 is hollow inside and has a first port 14 for connecting a pipe from a pressure source, such as a compressor (not shown), at one end (hereinafter, referred to as "distal end in an axis L1 direction") of a first axis L1 direction (hereinafter, referred to as "axis L1 direction") in the first body 12. A second port 15 for connecting with a supply/exhaust port of, for example, a double-acting fluid pressure cylinder is provided at one end (hereinafter, referred to as "distal end in an axis L2 direction") of a second axis L2 direction (hereinafter, referred to as "axis L2 direction") in the second body 13, and a fluid channel 16 that communicates these first port 14 and second port 15 is formed inside the first body 12 and the second body 13.

The first body 12 includes a valve accommodating part 12a formed on the other end in the axis L1 direction (hereinafter, referred to as "proximal end in the axis L1 direction") in the first body 12, and a port forming part 12b formed on a distal end side in the axis L1 direction. The first port 14 is open at the distal end of the port forming part 12b in the axis L1 direction, and a simple connection-type fitting 17 is attached to the first port 14.

The fitting 17 is configured to be able to, when one end of a pipe is inserted into the fitting 17, place the pipe in a retained state by a plurality of locking pieces 17a catching the outer periphery of the pipe to be locked, and, when a release bush 17b is pushed into the fitting 17, pull out the pipe by the distal end of the release bush 17b expanding the locking pieces 17a outward to be spaced apart from the pipe.

A cylindrical check valve holder 20 and a cylindrical needle valve holder 21 having different inside diameter parts and outside diameter parts in multiple stages are provided coaxially in the hollow portion inside the valve accommodating part 12a from the distal end side in the axis L1 direction toward the proximal end side in the axis L1 direction. Part of the fluid channel 16 is bifurcated by the check valve holder 20 into a first channel 16a and a second channel 16b (channel) parallel to each other. A seal 23 that airtightly seals a gap from the inner periphery of the valve accommodating part 12a is mounted on the outer periphery of the needle valve holder 21 adjacent to the distal end in the axis L1 direction. The check valve holder 20 and the needle valve holder 21 are integrally molded from a synthetic resin.

The first channel 16a is an annular channel formed between the outer periphery of the check valve holder 20 and the inner periphery of the first body 12, and the second channel 16b is a channel that passes through a center hole 22 of the check valve holder 20. The first channel 16a and the second channel 16b communicate with a communication channel 19 in the second body 13 through an internal channel 16c between the check valve holder 20 and the needle valve holder 21.

An annular check valve 25 that limits the direction of flow of compressed fluid flowing through the first channel 16a is provided in the first channel 16a. The check valve 25 is airtightly mounted in an annular recess 20a formed on the outer periphery of the check valve holder 20, and the radially outer side of the check valve 25 deforms under the action of compressed air. Then, the check valve 25 opens or closes the first channel 16a by contacting and separating from a surface facing the proximal end side in the axis L1 direction in an annular seat 26 that projects radially inward from the inner periphery of the first body 12.

In other words, in the present embodiment, since the check valve 25 extends radially outward, the check valve 25 separates from the seat 26 and opens the first channel 16a for the forward flow of compressed air from the first port 14 toward the second port 15, and permits the forward flow. On the other hand, the check valve 25 contacts the seat 26 and closes the first channel 16a airtightly for the reverse flow of compressed air from the second port 15 toward the first port 14, and blocks the reverse flow.

A valve hole 21a that extends through in the axis L1 direction is formed inside the needle valve holder 21, and the needle valve 27 is fitted in the valve hole 21a airtightly via the valve seal 28 and is able to move forward and backward along the axis L1 direction. With the forward and backward movement of the needle valve 27, a throttle part 27a formed at the distal end of the needle valve 27 is able to be inserted into and pulled out from a throttle hole 29 of the center hole 22 of the check valve holder 20. In other words, when the throttle part 27a moves forward and backward in the axis L1 direction with respect to the throttle hole 29, the distance (that is, channel section area) between the throttle part 27a and the throttle hole 29 changes, and the flow rate of compressed air flowing through the second channel 16b is controlled.

Figure 6:
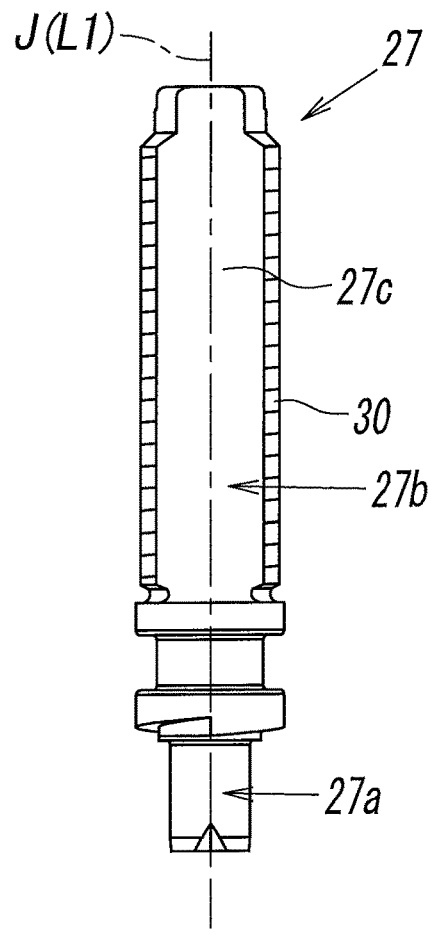
FIG. 6 is a side view of a needle valve shown in FIG. 4.

Here, the needle valve 27 and the needle guide 31 that moves this in the axial direction will be specifically described. As shown in FIG. 6, the needle valve 27 is formed in a cylindrical columnar shape extending in the axis L1 direction, and has the throttle part 27a at the distal end, and a needle body 27b formed on the proximal end side in the axis L1 direction with respect to the throttle part 27a. The needle valve 27 is made of, for example, a synthetic resin, such as PBT resin. The needle body 27b is larger in diameter than the throttle part 27a, and a pair of flat cutout surfaces 27c, 27c is formed opposite to each other on both sides in the radial direction via the central axis J (that is, the first axis L1). The needle body 27b having these cutout surfaces 27c, 27c is inserted in the shaft portion 40, and, as described above, the needle valve 27 is in a state fixed around the axis L1 with respect to the shaft portion 40. In addition, an external thread 30 is formed on the outer periphery of the needle body 27b, except the cutout surfaces 27c, 27c.

Figure 4:
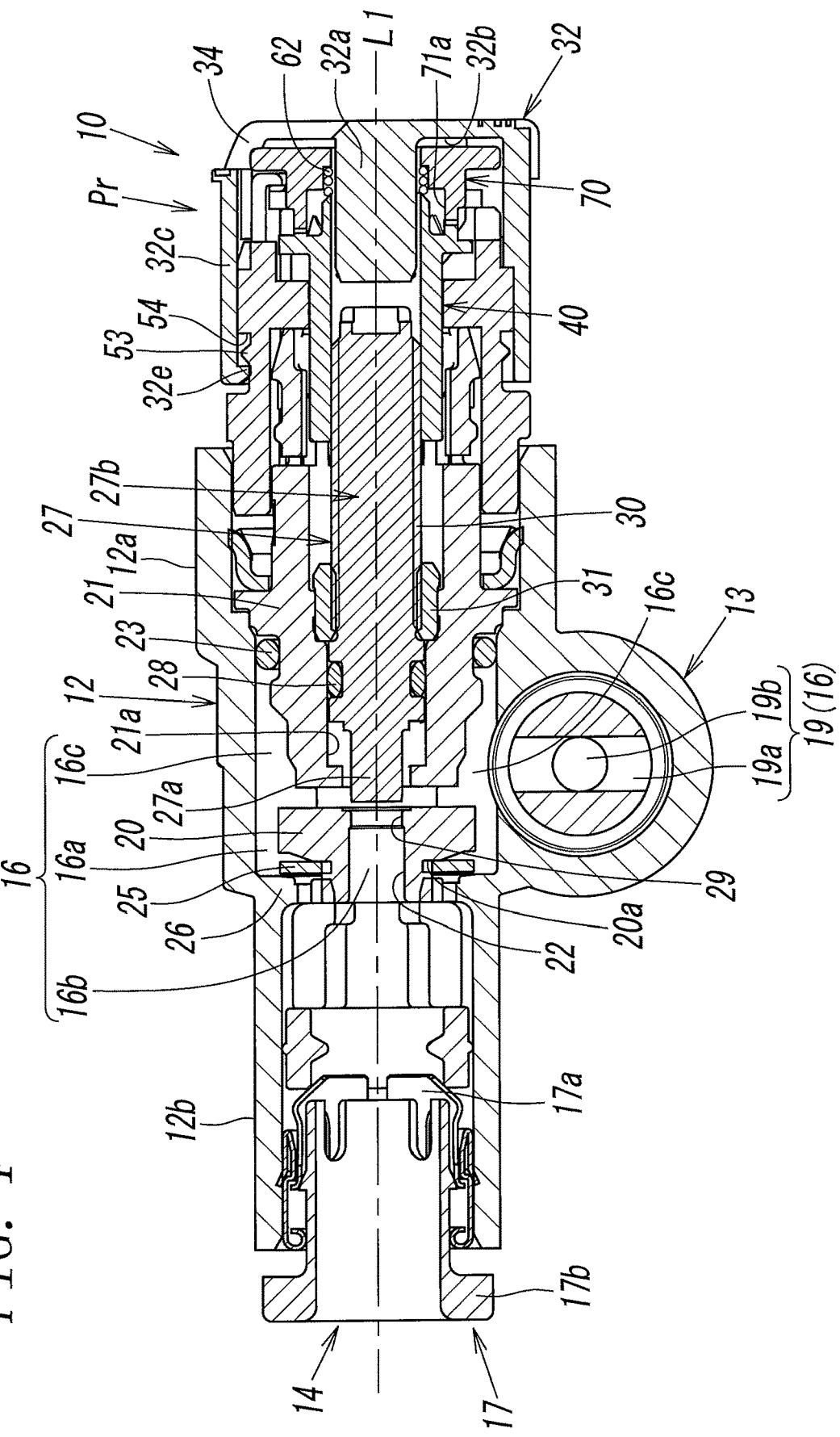
FIG. 4 is a sectional view taken along the IV-IV in the flow control valve shown in FIG. 1.
Figure 7:
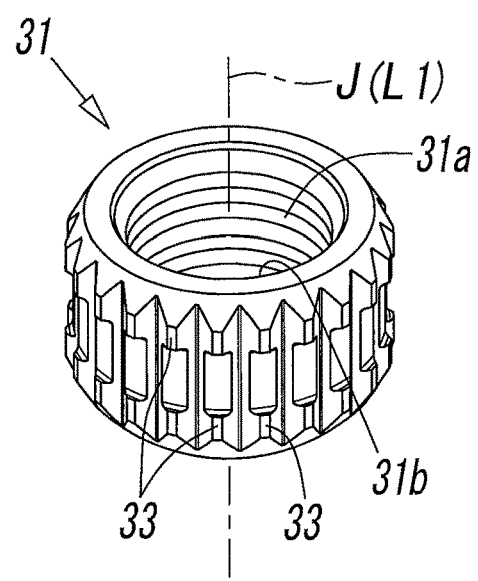
FIG. 7 is a perspective view of a needle guide shown in FIG. 4.
Figure 8:
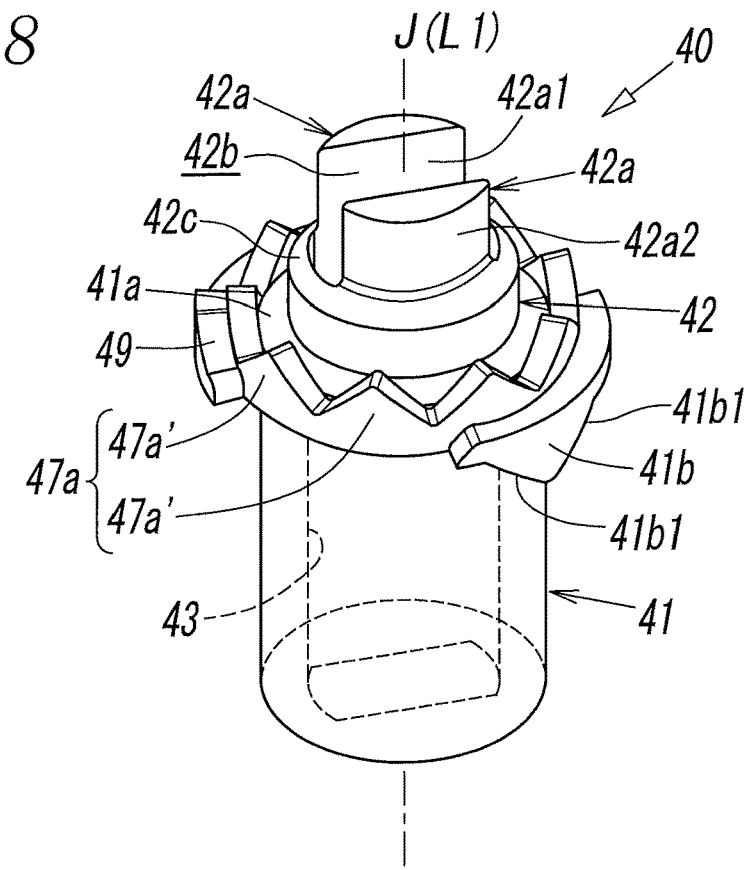
FIG. 8 is a perspective view when a shaft portion shown in FIG. 5 is viewed from one side.
Figure 9:
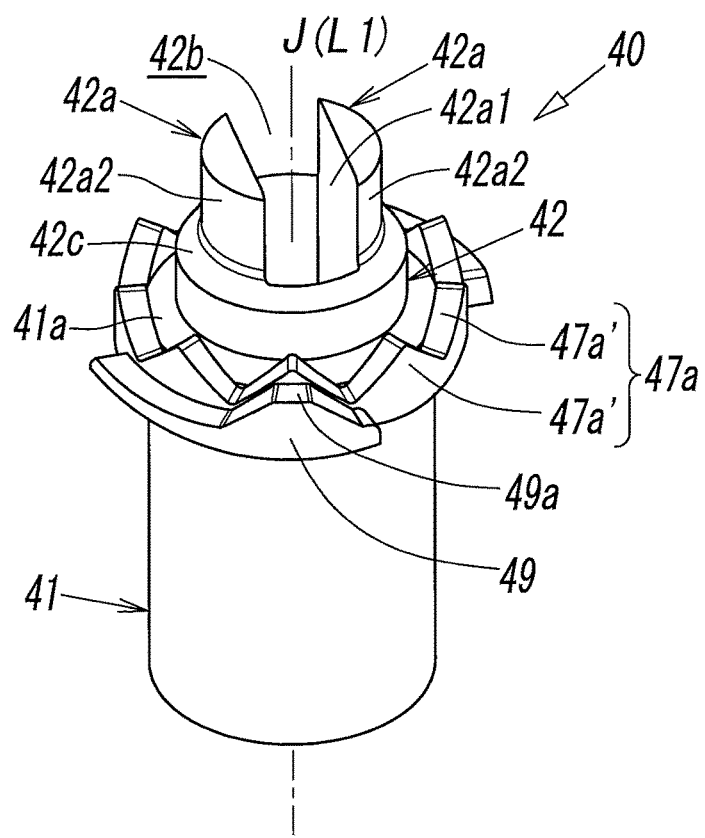
FIG. 9 is a perspective view when the shaft portion is viewed from the other side.
Figure 10:
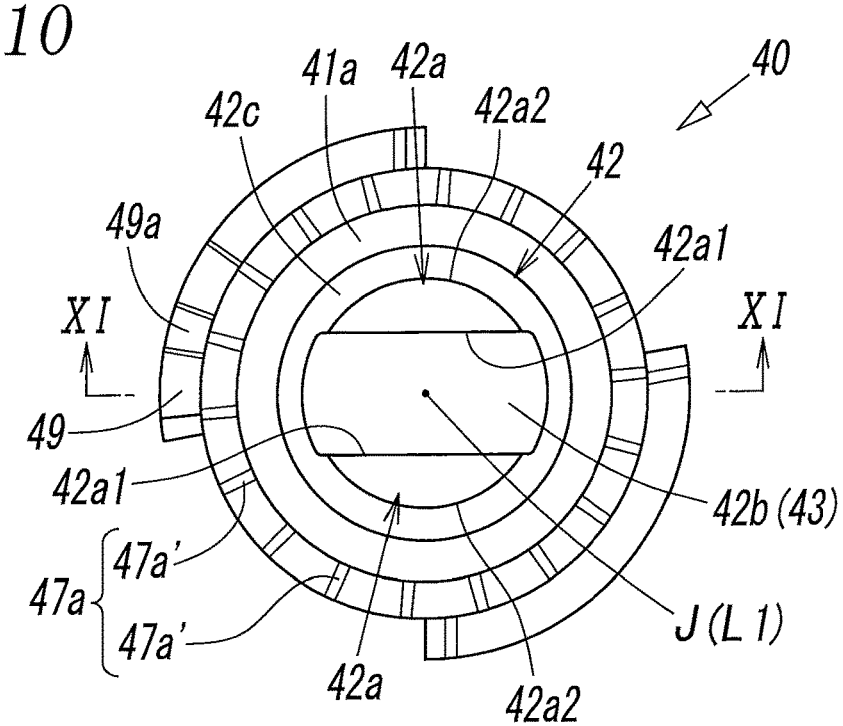
FIG. 10 is a front view of the shaft portion.
Figure 11:
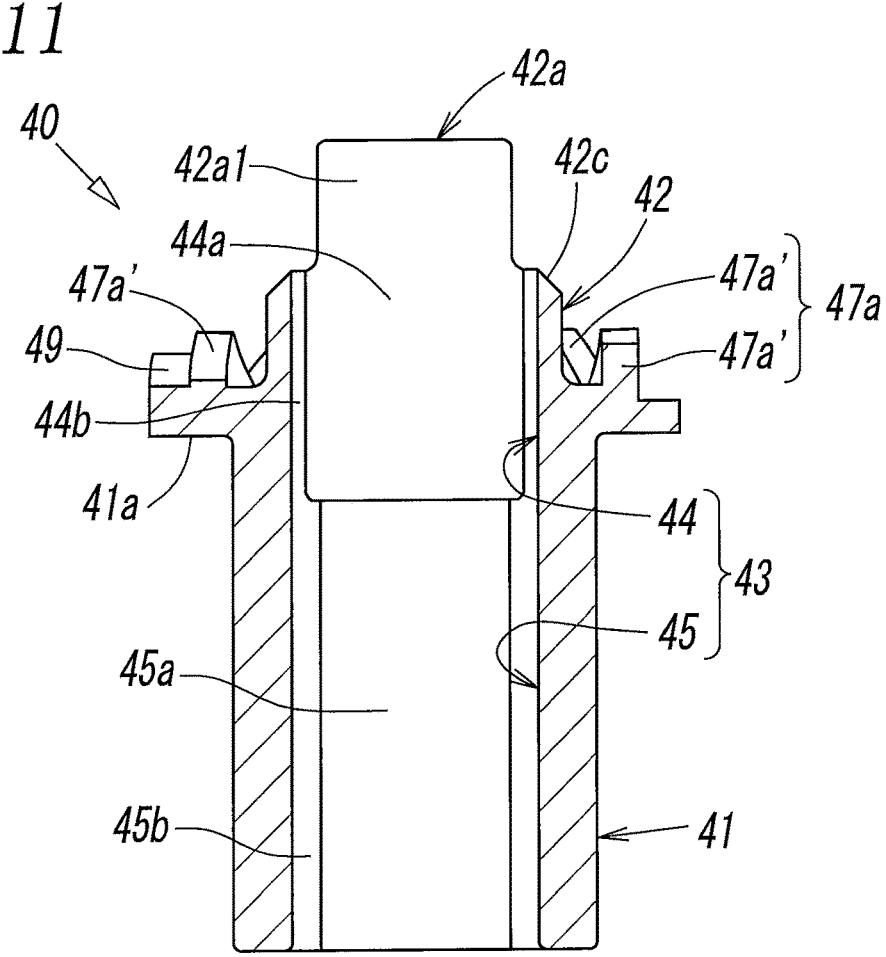
FIG. 11 is a sectional view taken along the line X-X in FIG. 10.
Figure 12:
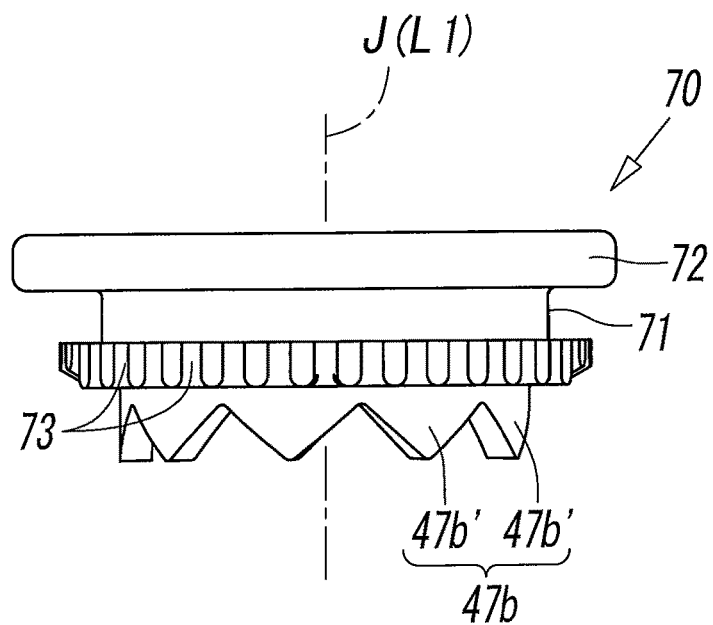
FIG. 12 is a side view of a scale body shown in FIG. 5.
Figure 13:
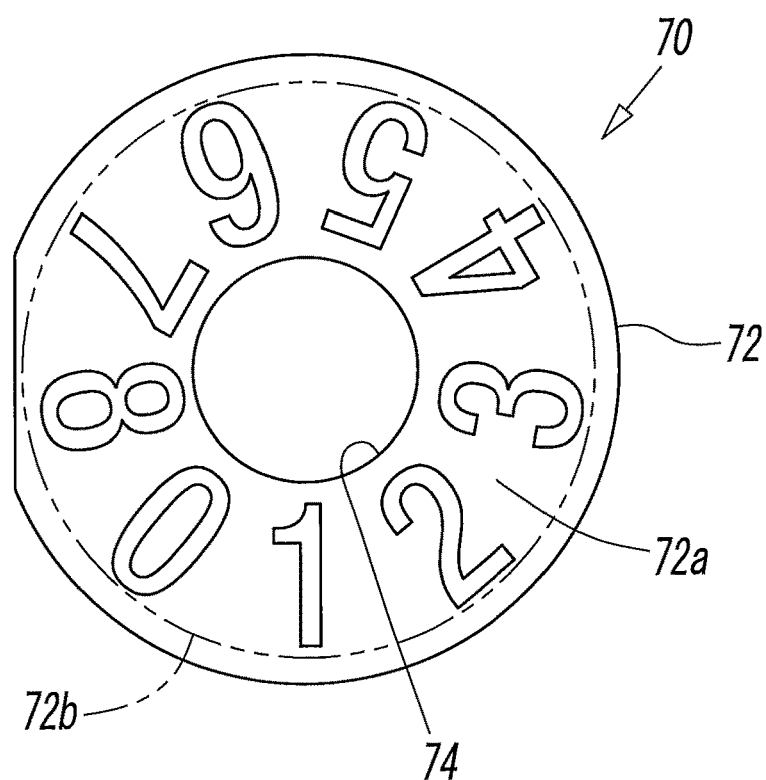
FIG. 13 is a front view of the scale body.

As shown in FIGS. 4 and 7, the needle guide 31 is formed in a cylindrical shape and provided on the distal end side in the axis L1 direction with respect to the shaft portion 40. A through-hole 31b that extends through in the axis L1 direction is provided inside the needle guide 31, and an internal thread 31a to which the external thread 30 of the needle valve 27 is screwed is formed on the inner periphery. The needle guide 31 is made of, for example, a metal and preferably made of an alloy (for example, brass).

A plurality of locking protrusions 33 that protrude radially outward is formed at equal intervals in the circumferential direction on the outer periphery of the needle guide 31. These locking protrusions 33 are used to, when the needle guide 31 is fitted in a predetermined position in the valve hole 21a of the needle valve holder 21, prevent the rotation of the needle guide 31 with respect to the needle valve holder 21 and the falling off of the needle guide 31 from the valve hole 21a by being pressed against the inner wall of the valve hole 21a of the needle valve holder 21.

A cap-type knob 32 for rotating operation is coupled via the cylindrical shaft portion 40 to the proximal end side of the needle valve 27 in the axis L1 direction. Specifically, the needle valve 27 is inserted to the shaft portion 40 in a state mutually fixed in the rotation direction (around the axis L1) and movable in the axis L1 direction. The knob 32 is inserted to the proximal end-side end of the shaft portion 40 in the axis L1 direction in a state mutually fixed around the axis L1 and movable in the axis L1 direction. Therefore, when the knob 32 is rotated in the forward or reverse direction, the needle valve 27 is rotated in the forward or reverse direction and guided by the needle guide 31 to move forward or backward in the axis L1 direction. Therefore, the needle valve 27 is able to adjust the opening degree of the second channel 16b by moving forward or backward with the rotating operation of the knob 32.

Incidentally, in the flow control valve 10 according to the present embodiment, by indicating the rotating operation amount of the knob 32, that is, the opening degree of the second channel 16b with the needle valve 27, by number or symbol, the opening degree can be visually checked. Therefore, the flow control valve 10 includes a scale body 70 supported so as to be rotatable around the axis L1 and having scale marks 72b that indicate the rotating operation amounts of the knob 32, a scale reading part 34 that rotates constantly integrally with the knob 32 around the axis L1 and that indicates the scale mark 72b corresponding to the rotating operation amount of the knob 32, and a clutch mechanism 47 (see FIG. 21) that changes the scale mark 72b of the scale body 70, indicated by the scale reading part 34, each time the knob 32 is rotated by a predetermined angle by transmitting the rotation of the knob 32 to the scale body 70 or interrupting the transmission.

Figure 5:
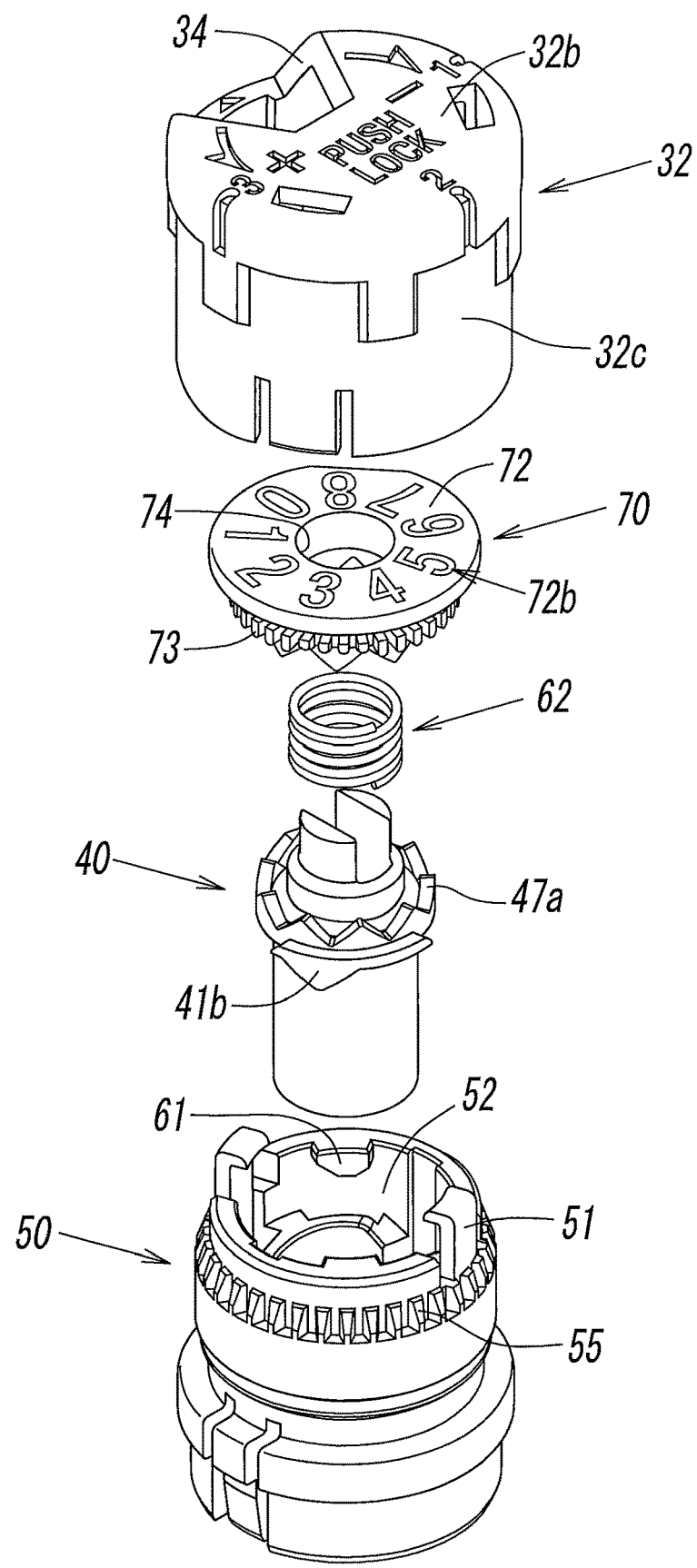
FIG. 5 is an exploded perspective view of an indication switch mechanism in the flow control valve shown in FIG. 1.

Hereinafter, such an indication mechanism that indicates the rotating operation amount of the knob 32 (that is, the opening degree of the second channel 16b with the needle valve 27) will be specifically described with reference to FIGS. 4 to 23. As shown in FIGS. 4 and 5, in the flow control valve 10 according to the present embodiment, main components concerned with the indication mechanism, that is, a spacer 50, the shaft portion 40, a coil spring 62, the scale body 70, and the knob 32, are disposed coaxially with the first axis L1 in the valve accommodating part 12a and on the proximal end side in the axis L1 direction with respect to the valve accommodating part 12a.

As shown in FIGS. 4, and 8 to 11, the shaft portion 40 is formed in a cylindrical shape extending in the axis L1 direction and has a first shaft part 41 on the distal end side in the axis L1 direction, and a second shaft part 42 on the proximal end side in the axis L1 direction with respect to the first shaft part 41. The shaft portion 40 is made of, for example, a synthetic resin and is preferably made of polyphenylene sulfide resin (PPS resin). The second shaft part 42 is smaller in diameter than the first shaft part 41, and a pair of side walls 42a, 42a extending to the proximal end side in the axial direction is formed at the proximal end of the second shaft part 42 in the axial direction. The side walls 42a, 42a are disposed opposite each other via the central axis J in front view, and a space 42b to which the shaft portion 40 can be inserted is formed between the pair of side walls 42a, 42a. The space 42b is open on the proximal end side in the axis L1 direction and on both sides in the radial direction and communicates with a through-hole 43 extending through the shaft portion 40.

Flat parts 42a1 extending in the axial direction are formed on the inner sides of the side walls 42a, 42a, and curved parts 42a2 each made up of a circular arc about the central axis J are formed on the outer sides of the side walls 42a, 42a. The coil spring 62 (spring) is mounted radially outward of the pair of side walls 42a, 42a. The distal end of the coil spring 62 in the axis L1 direction contacts a step 42c that projects radially outward and that extends annularly at the proximal end of the second shaft part 42 in the axis L1 direction. The step 42c functions as a spring seat on the distal end side of the coil spring 62 in the axial direction.

The through-hole 43 extending through along the central axis J is provided in the shaft portion 40. The through-hole 43 is formed with a knob insertion hole 44 on the proximal end side in the axis L1 direction, to which an engaging protrusion 32a of the knob 32 is inserted, and a needle valve insertion hole 45 on the distal end side in the axis L1 direction, to which the needle valve 27 is inserted, and the sectional shapes of these knob insertion hole 44 and needle valve insertion hole 45 are different in size.

The knob insertion hole 44 extends from the proximal end of the first shaft part 41 in the axis L1 direction to the proximal end of the second shaft part 42 in the axis L1 direction and is formed of a pair of proximal end second flat parts 44a opposite to each other via the central axis J, and curved parts 44b each made up of a circular arc about the central axis J. The proximal end second flat parts 44a extend in the same plane as the flat parts 42a1 of the side walls 42a, 42a and are formed integrally with the flat parts 42a1. In the present embodiment, the integrally formed flat part 42a1 and proximal end second flat part 44a are formed in a rectangular shape extending in the axis L1 direction.

On the other hand, the needle valve insertion hole 45 extends from the distal end of the first shaft part 41 to the proximal end side in the axis L1 direction and is formed of a pair of proximal end first flat parts 45a opposite to each other via the central axis J, and curved parts 45b each made up of a circular arc about the central axis J. The proximal end first flat parts 45a are located radially outward of the proximal end second flat parts 44a and are formed such that the width in a direction orthogonal to the axial direction is narrower than that of the proximal end second flat parts 44a. It should be noted that the curved parts 44b of the knob insertion hole 44 on the second shaft part 42 side and the curved parts 45b of the needle valve insertion hole 45 on the first shaft part 41 side both have the same radius of curvature and are formed on the same curved surface.

When the engaging protrusion 32a of the knob 32 is inserted into the knob insertion hole 44 of the thus configured through-hole 43, the shaft portion 40 is movable in the axial direction with respect to the knob 32 and rotatable constantly integrally with the knob 32 around the axis. The needle valve insertion hole 45 of the through-hole 43 has a sectional shape similar to the sectional shape of the needle body 27b of the needle valve 27 and is formed so as to be slightly larger in section area than the needle body 27b. In this way, the shaft portion 40 is fixed to the needle valve 27 around the axis L1 and integrally rotates with the needle valve 27, while supporting the needle valve 27 via the needle guide 31 so as to be movable in the axis L1 direction.

An annular urging flange 41a that projects radially outward is formed at the proximal end-side end of the first shaft part 41 in the axis L1 direction. A plurality of meshing pieces 47a' that project toward the proximal end side in the axis L1 direction is formed on the proximal end-side end of the urging flange 41a in the axis L1 direction at equal intervals in the circumferential direction and makes up a meshing portion 47a (engaging portion). The meshing portion 47a is engaged with a gear portion 47b (see FIG. 12, engaged portion) provided on the scale body 70 (described later). Part of the clutch mechanism 47 (described later) is made up of these meshing portion 47a and gear portion 47b.

The urging flange 41a has a cam copying projection 41b that projects toward the distal end side in the axis L1 direction on the end surface of the radially outer end. The cam copying projection 41b is formed in a triangular shape in side view, and the distal end of the cam copying projection 41b is disposed opposite a cam surface 46 (see FIG. 17) provided on the spacer 50 (described later) and slidably contacts the cam surface 46. The cam copying projection 41b has side surfaces 41b1, 41b1 on both sides in the circumferential direction. The side surface 41b1 is inclined to the proximal end side in the axis L1 direction as it shifts toward the outer side in the circumferential direction. The cam copying projection 41b makes up the clutch drive mechanism 48 (see FIG. 21) together with the cam surface 46. In other words, the clutch drive mechanism 48 has a function of reciprocating the shaft portion 40 in the axis L1 direction in a manner such that the cam copying projection 41b slides on the annular cam surface 46 while rotating with the rotation of the shaft portion 40, caused by the rotating operation of the knob 32.

The urging flange 41a has a second contact part 49 that projects toward the proximal end side in the axis L1 direction on the end surface of the radially outer end. The second contact part 49 is formed in a triangular shape that projects toward the proximal end side in the axial direction in side view, and a flat part 49a extending in the circumferential direction is formed at the distal end of the second contact part 49. The flat part 49a is disposed opposite a jump preventing wall 61 (see FIGS. 17 and 25) provided in the spacer 50 (described later) and is able to contact the jump preventing wall 61. In the present embodiment, the second contact part 49 is disposed at 90° apart in the circumferential direction from the cam copying projection 41b.

When the engaging protrusion 32a (see FIG. 4) of the knob 32 is fitted to the through-hole 43 in the second shaft part 42, the shaft portion 40 is fixed to the knob 32 around the axis L1 and rotates integrally with the knob 32, while the shaft portion 40 is movable in the axis L1 direction with respect to the knob 32, as described above. The coil spring 62 (spring) made up of a compression spring is mounted radially outward of the pair of side walls 42a, 42a of the second shaft part 42, as shown in FIG. 4. In the coil spring 62, the distal end-side end in the axis L1 direction contacts the step 42c of the proximal end-side end of the second shaft part 42 of the shaft portion 40 in the axis L1 direction, while the proximal end-side end in the axis L1 direction contacts a spring seat 71b (see FIG. 14) formed in the scale body 70 and constantly urges the shaft portion 40 toward the distal end side in the axis L1 direction. In addition, the coil spring 62 brings the resistance generating projections 73 (see FIG. 14) provided in the scale body 70 (described later) into contact with the first contact parts 51d (see FIG. 15) provided in the spacer 50, by urging the scale body 70 to the proximal end side in the axis L1 direction via the spring seat 71b and the step 42c.

Here, in the present embodiment, the clutch drive mechanism 48 is made up of the above-described shaft portion 40, cam surface 46, cam copying projection 41b, and coil spring 62. The clutch mechanism 47 is made up of the clutch drive mechanism 48, the meshing portion (engaging portion) 47a, and the gear portion (engaged portion) 47b.

As shown in FIGS. 4, and 12 to 14, the scale body 70 is formed in a cylindrical shape extending along the axis L1 direction, the scale body 70 is disposed so as to surround a proximal end-side part of the shaft portion 40 in the axis L1 direction and is provided so as to be rotatable around the axis L1 with respect to the shaft portion 40. The scale body 70 is made of, for example, a synthetic resin and is preferably made of polyacetal (POM). The scale body 70 has a ring body 71 formed in a cylindrical shape, and a flange-shaped scale mark dial 72 that extends annularly in the circumferential direction is formed at the proximal end-side end of the ring body 71 in the axis L1 direction so as to project radially outward. An annular flat part 72a that extends in the circumferential direction is formed on the proximal end-side end surface of the scale mark dial 72 in the axis L1 direction, and the flat part 72a has the scale marks 72b that indicate the rotating operation amounts (for example, the numbers of revolutions) of the knob 32. A ring hole 74 that extends through in the axis L1 direction is provided inside the ring body 71, and the engaging protrusion 32a of the knob 32 is rotatably inserted in the ring hole 74.

In the present embodiment, the scale marks 72b indicate numbers 1, 2, 3, . . . that indicate the numbers of revolutions of the knob 32 (that is, the numbers of times the knob 32 is rotated by 180 degrees). Of the series of the scale marks 72b, the scale mark 72b corresponding to an actual rotating operation amount of the knob 32 is indicated by the scale reading part 34 provided at the knob 32.

The plurality of resistance generating projections 73 provided at intervals around the axis is formed on the outer surface of an intermediate part of the ring body 71 in the axis L1 direction so as to protrude radially outward. The outside diameter of these resistance generating projections 73 is less than the outside diameter of the scale mark dial 72 and is formed so as to be less than the outside diameter of a locking protrusion 51a of the spacer 50 (described later). The resistance generating projections 73 are located on the distal end side in the axis L1 direction with respect to the locking protrusions 51a of the spacer 50. The resistance generating projections 73 are capable of preventing co-rotation of the scale mark dial 72 with respect to the knob 32 during rotating operation of the knob 32 by contacting the first contact parts 51d (see FIG. 15) projecting on the inner surfaces of the locking protrusions 51a of the spacer 50 (described later). In the present embodiment, the plurality of resistance generating projections 73 extends in a radial direction radially outward with respect to the central axis J.

The scale body 70 is restricted from moving in the axis L1 direction by the insertion of the locking protrusions 51a of the spacer 50 in the spaces between the scale mark dial 72 and the resistance generating projections 73. In the present embodiment, a gap is formed between the flat part 72a of the scale mark dial 72 and a top 32b of the knob 32.

Figure 14:
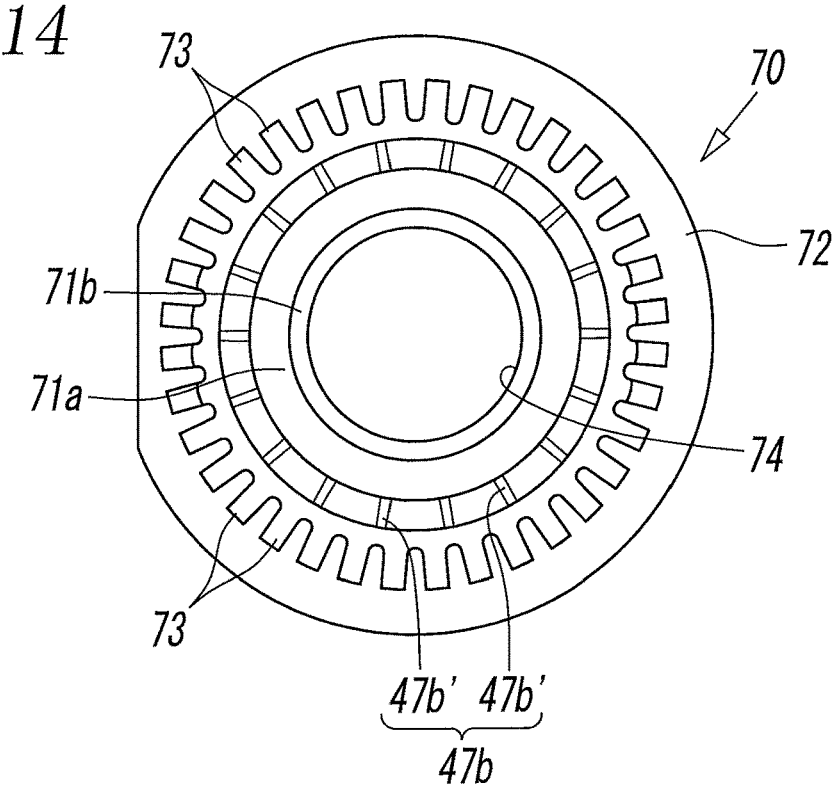
FIG. 14 is a rear view of the scale body.

As shown in FIGS. 4 and 14, a circular recess 71a that is recessed to the proximal end side in the axis L1 direction along the axis L1 direction is formed inside the ring body 71, and an opening that communicates with the ring hole 74 is formed at the proximal end of the recess 71a in the axis L1 direction. The engaging protrusion 32a of the knob 32 inserted through the ring hole 74 and the coil spring 62 are accommodated in the recess 71a, and an annular spring seat 71b that is recessed to the proximal end side in the axis L1 direction is formed at the periphery of the opening. The proximal end-side end of the coil spring 62 in the axis L1 direction contacts the spring seat 71b.

A plurality of gear pieces 47b' that protrude to the distal end side in the axis L1 direction is provided on the distal end side of the ring body 71 in the axis L1 direction. In the present embodiment, the plurality of gear pieces 47b' is arranged at predetermined intervals in the circumferential direction to form the gear portion 47b (engaged portion). The gear portion 47b is disposed opposite the meshing portion 47a of the shaft portion 40 on the proximal end side in the axis L1 direction with respect to the meshing portion 47a and is able to switch between an engaged state of being meshed with the meshing portion 47a and an engagement released state of being pulled out from the meshed meshing portion 47a by reciprocation of the shaft portion 40 in the axis L1 direction. Then, as described above, the gear portion 47b makes up part of the clutch mechanism 47 together with the meshing portion 47a provided in the shaft portion 40, and is able to transmit the rotation of the shaft portion 40 to the scale body 70 or interrupt transmission of the rotation of the shaft portion 40 with respect to the scale body 70 by engagement or release with the meshing portion 47a resulting from the rotating operation of the knob 32.

Figure 23:
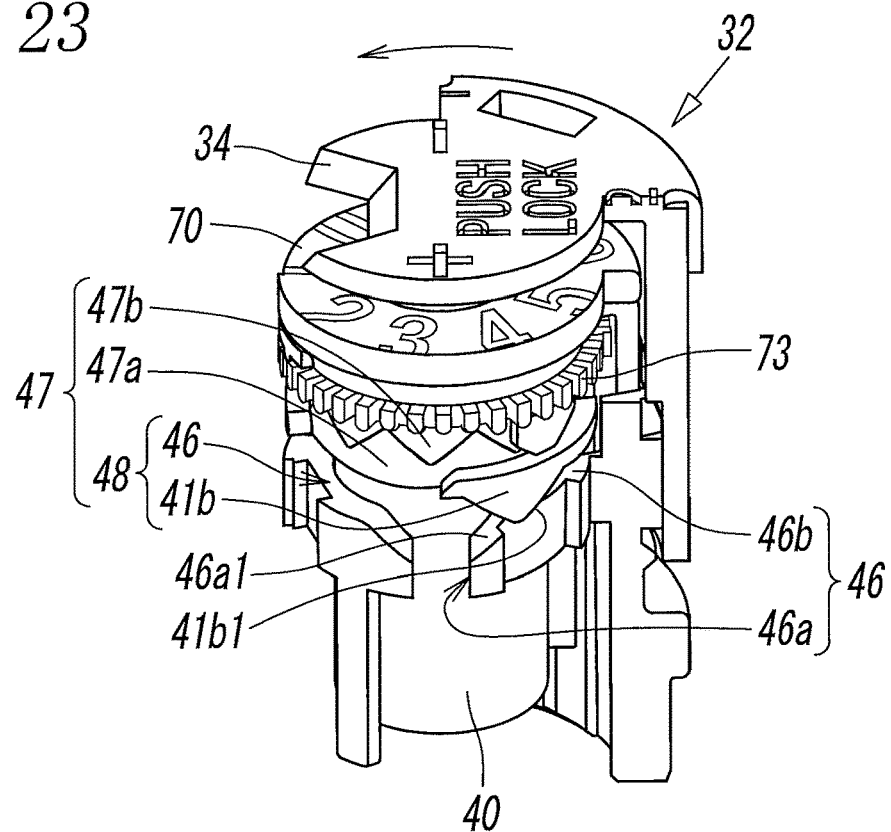
FIG. 23 is a view for illustrating the operation of the clutch mechanism shown in FIG. 5 and showing that the rotation of the knob and the scale body is in a non-lock state.

In other words, as shown in FIGS. 4 and 23, in the clutch mechanism 47, when the meshing portion 47a and the gear portion 47b are in an engaged state, the rotation of the knob 32 is transmitted, and the scale body 70 rotates integrally with the knob 32. On the other hand, when engagement between these meshing portion 47a and gear portion 47b is in a released state, transmission of the rotation of the knob 32 to the scale body 70 is interrupted, and the scale mark 72b of the scale body 70, indicated by the scale reading part 34 of the knob 32, is changed by rotating the knob 32 with respect to the scale body 70.

However, when the scale body 70 is in contact with the knob 32 or a member that rotates constantly integrally with the knob 32 while transmission of the rotation of the knob 32 with respect to the scale body 70 is in an interrupted state in this way, the scale body 70 rotates together with the knob 32 and, therefore, there is a possibility that accurate changing of the scale mark 72b cannot be performed. For this reason, in the present embodiment, the plurality of resistance generating projections 73 that project radially outward from the outer surface of the ring body 71 and that are arranged at equal intervals around the axis is provided in the scale body 70. The first contact part 51d (see FIG. 15) is provided so as to protrude from the inner surface 51c of the locking protrusion 51a of the spacer 50 toward the distal end side in the axis L1 direction.

Figure 15:
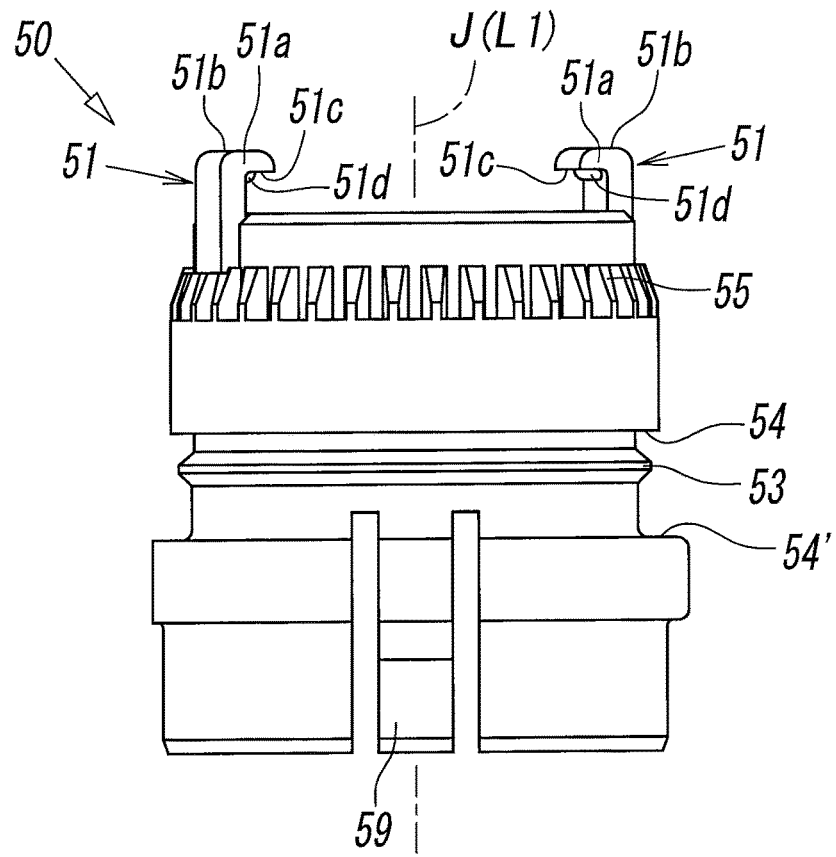
FIG. 15 is a side view of a spacer shown in FIG. 5.

As shown in FIG. 15, the first contact parts 51d are provided on both sides of the spacer 50 in the radial direction via the central axis J. On the other hand, the resistance generating projections 73 each are formed integrally with the ring body 71, and the distal end side is elastically deformable in the axis L1 direction about a proximal end formed integrally with the ring body 71. The resistance generating projection 73 is formed in a rectangular shape so as to extend in the axis L1 direction in side view, and the first contact part 51d slidably contacts the proximal end-side surface (resistance force generating surface) of the resistance generating projection 73 in the axis L1 direction. Therefore, when the scale mark 72b indicated by the scale reading part 34 is changed, co-rotation of the scale body 70 with the rotation of the knob 32 is prevented by the resistance force generated between the resistance generating projections 73 and the first contact parts 51d.

The number of the first contact parts 51d provided in the spacer is not limited to two as in the case of the present embodiment and just needs to be multiple. The shape of the resistance generating projection 73 is not limited to a rectangular shape and may be any shape as long as the shape is suitable for frictional sliding.

As shown in FIGS. 4, and 15 to 17, the spacer 50 is formed in a cylindrical shape along the axis L1 direction (central axis J direction) and is disposed radially outward of the shaft portion 40 so as to surround the shaft portion 40. The through-hole 52 that extends through in the axis L1 direction is formed inside the spacer 50, and the inside diameter of the through-hole 52 is formed so as to be slightly larger than the outside diameter of the urging flange 41a of the shaft portion 40. Therefore, the shaft portion 40 is movable in the axis L1 direction with respect to the spacer 50. The spacer 50 is made of, for example, a synthetic resin and is preferably made of polybutylene terephthalate resin (PBT resin).

Figure 17:
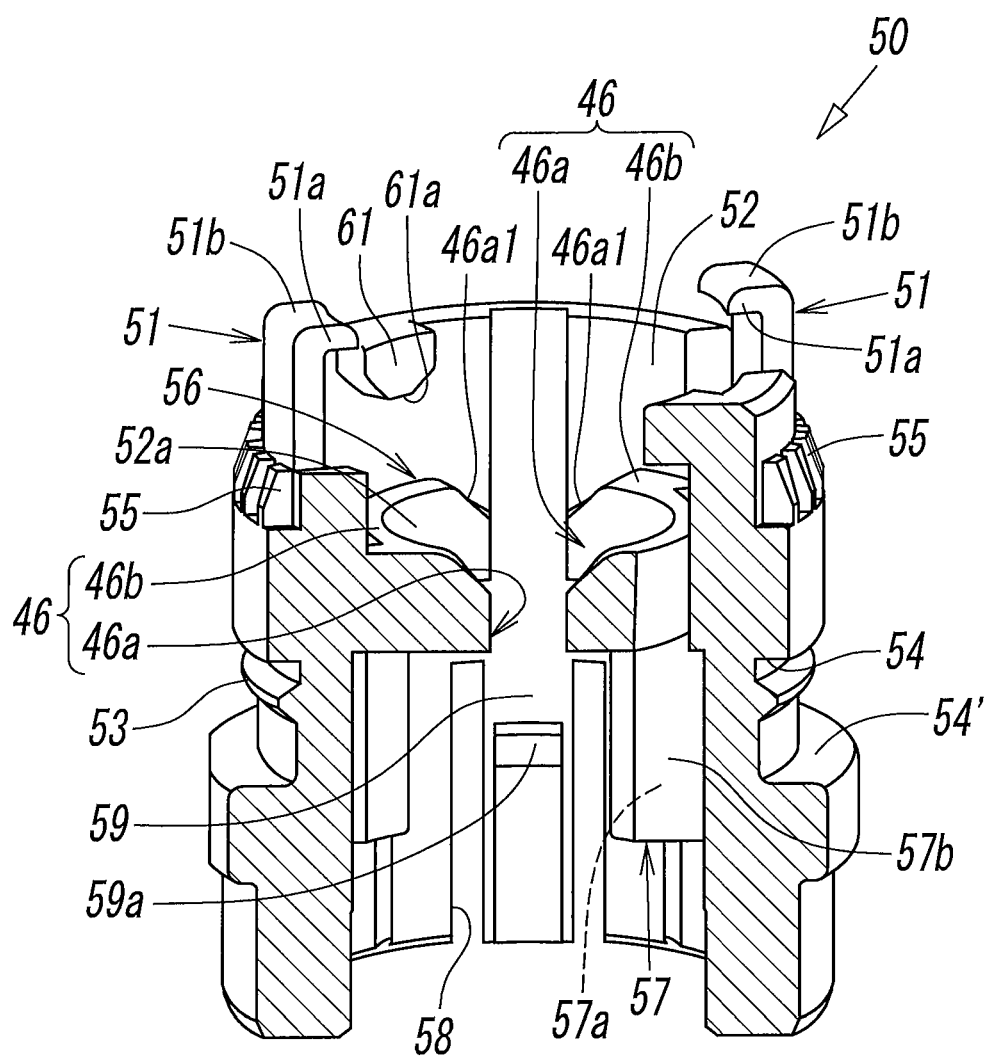
FIG. 17 is a sectional view taken along the line XVII-XVII in FIG. 16.

As shown in FIG. 17, a fixing piece 57 that projects radially inward is provided on the distal end side in the axis L1 direction on the inner surface forming the through-hole 52 of the spacer 50. In the present embodiment, the fixing pieces 57, 57 are provided on both sides in the radial direction via the central axis J. The fixing piece 57 extends along the axis L1 direction and has a first surface 57a that extends radially inward with an acute angle with respect to the inner surface of the through-hole 52 in plan view and a second surface 57b that extends radially inward with a further smaller acute angle with respect to the inner surface.

Figure 18:
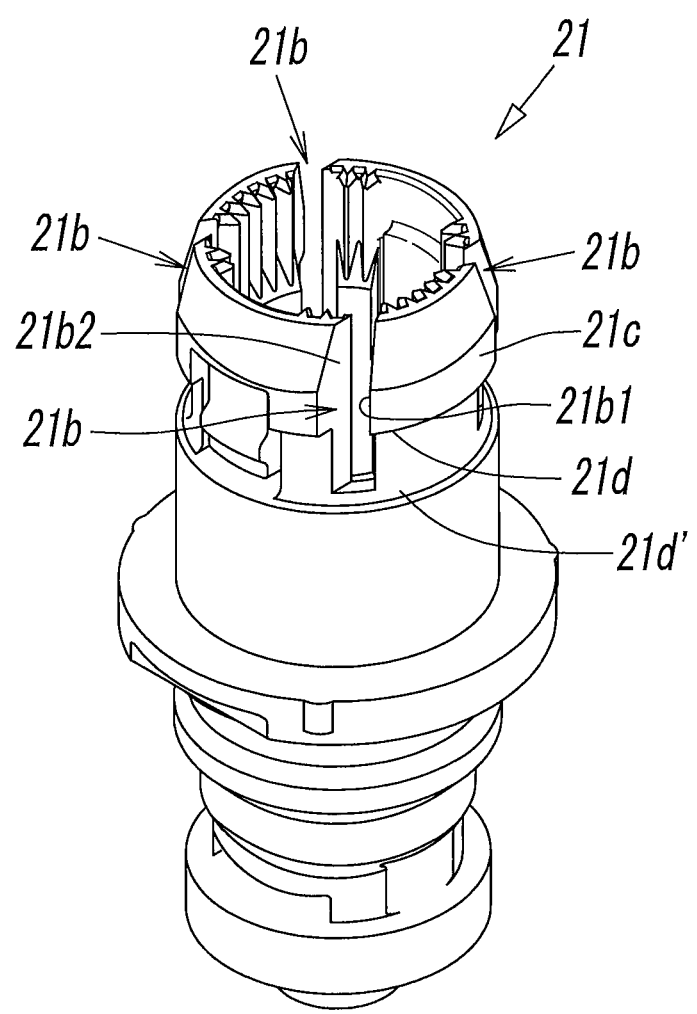
FIG. 18 is a perspective view of a needle valve holder shown in FIG. 4.

These fixing pieces 57 are inserted in fixing hole parts 21b formed on the proximal end side of the needle valve holder 21 shown in FIG. 18 in the axis L1 direction and block the rotation of the spacer 50 around the axis L1. The fixing hole part 21b is formed in a circumferential wall 21c of the needle valve holder 21 on the proximal end side in the axis L1 direction, opens at the proximal end-side end of the circumferential wall 21c in the axis L1 direction, and extends to the distal end side in the axis L1 direction. The fixing hole part 21b extends in a direction inclined with respect to the radial direction in plan view and has a first fixing surface part 21b1 that the first surface 57a of the fixing piece 57 contacts and a second fixing surface part 21b2 that the second surface 57b of the fixing piece 57 contacts.

As shown in FIG. 17, an opening 58 that extends from the proximal end side in the axis L1 direction to the distal end side is formed at a location adjacent in the circumferential direction to the fixing piece 57 of the spacer 50, and a plate-shaped leg 59 that connects with the proximal end-side end in the axis L1 direction and that extends to the distal end side in the axis L1 direction is formed in the opening 58. A locking projection 59a that projects radially inward is provided on the inner surface of the leg 59 on the proximal end side in the axis L1 direction. The radially inner end of the locking projection 59a slightly projects inward from the inner surface of the through-hole 52 and is locked between a pair of annular steps 21d, 21d' formed with a gap in the axis L1 direction on the proximal end side of the needle valve holder 21 in the axis L1 direction, shown in FIG. 18. Therefore, the spacer 50 is restricted from moving in the axis L1 direction of the needle valve holder 21 and fixed.

Figure 16:
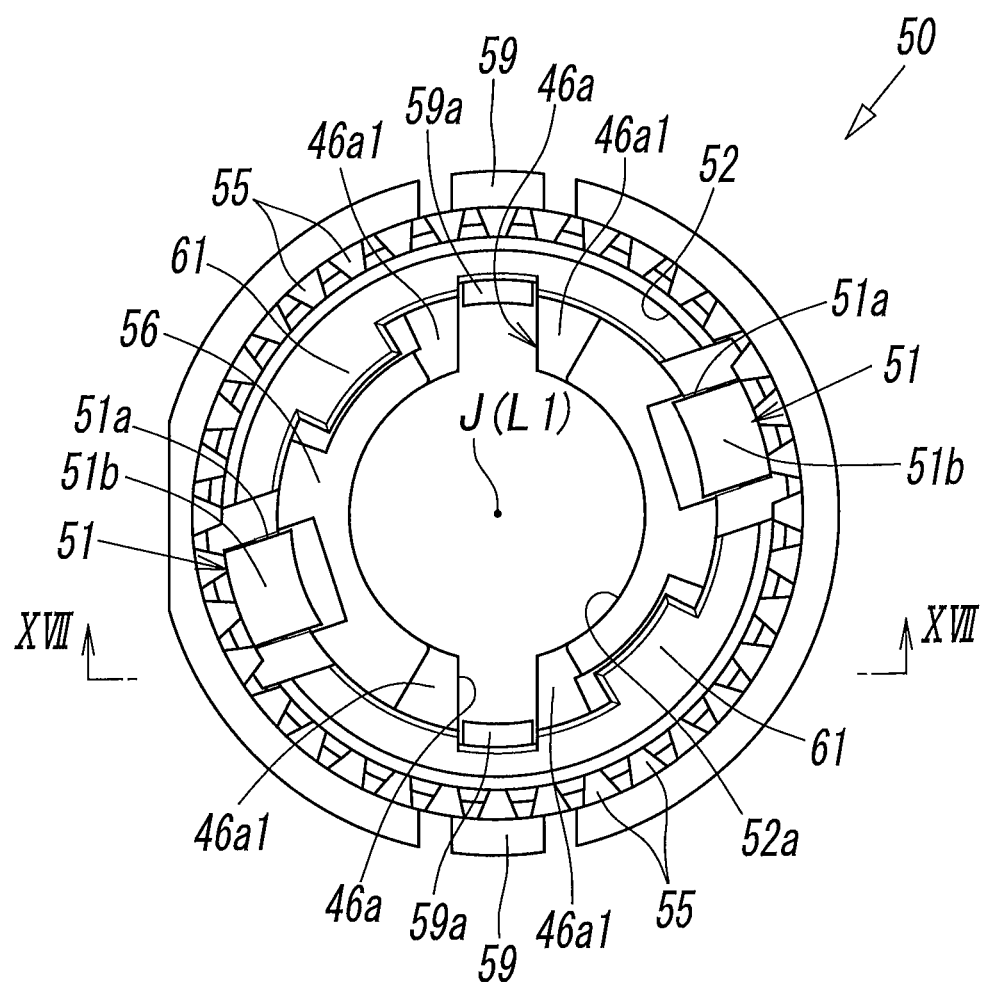
FIG. 16 is a front view of the spacer.

As shown in FIGS. 16 and 17, a collar 56 that projects radially inward is formed annularly in the circumferential direction on the proximal end side in the axis L1 direction on the inner surface of the spacer 50 forming the through-hole 52. The collar 56 has a predetermined thickness in the axis L1 direction, and a small-diameter part 52a of the through-hole 52, narrowed in inside diameter by the collar 56, extends through in the axis L1 direction inside the collar 56. The inside diameter of the small-diameter part 52a is slightly larger in size than the outside diameter of the shaft portion 40. Therefore, the shaft portion 40 is movable inside the small-diameter part 52a in the axis L1 direction.

The above-described cam surface 46 that extends in the circumferential direction is formed at the proximal end of the collar 56 in the axis L1 direction, and the cam surface 46 has a cam hole 46a that extends through in the axis L1 direction and a planar cam flat part 46b that extends in the circumferential direction from the proximal end of the cam hole 46a in the axis L1 direction. The above-described cam copying projection 41b (see FIG. 8) is slidable on the cam flat part 46b. The cam hole 46a is formed on both sides in the radial direction via the central axis J of the spacer 50 in the collar 56. The cam hole 46a has an inclined surface 46a1 that extends to the proximal end side in the axis L1 direction as it shifts toward the outer side in the circumferential direction on both sides in the circumferential direction. In the present embodiment, the inclined surface 46a1 is formed from the intermediate part of the cam hole 46a in the axis L1 direction to the proximal end in the axis L1 direction. The cam hole 46a is able to transmit the rotation of the knob 32 to the scale body 70 or interrupt the transmission by engaging with the cam copying projection 41b formed in the above-described shaft portion 40 or releasing the engagement.

As shown in FIGS. 16 and 17, jump preventing walls 61 that project radially inward and that extend to the distal end side in the axis L1 direction are formed at the proximal end in the axis L1 direction on the inner surface of the spacer 50 forming the through-hole 52. In the present embodiment, the jump preventing walls 61 are formed on both sides in the radial direction via the central axis J of the spacer 50. The jump preventing wall 61 has a contact surface 61a that extends in a planar shape in the circumferential direction at the distal end in the axis L1 direction. The contact surface 61a is able to block movement of the shaft portion 40 to the proximal end side in the axis L1 direction by contacting the second contact part 49 provided in the shaft portion 40 (described later).

As shown in FIGS. 15 and 17, an annular projection 53 that projects radially outward is formed annularly in the circumferential direction at the intermediate part in the axis L1 direction on the radially outer side of the spacer 50. When an engaging hook 32e (see FIG. 20) of the knob 32 is locked to the annular projection 53, the knob 32 is locked in the rotation direction with respect to the spacer 50 although details will be described later. Steps 54, 54' that extend radially outward are formed annularly on the proximal end side and distal end side in the axis L1 direction with respect to the annular projection 53.

A pair of locking hooks 51 disposed on both sides in the radial direction via the central axis J and protruding to the proximal end side in the axis L1 direction is provided on the proximal end side of the spacer 50 in the axis L1 direction. A locking protrusion 51a that protrudes radially inward is provided at the proximal end of the locking hook 51 in the axis L1 direction. A surface of the locking protrusion 51a, facing the proximal end side in the axis L1 direction, forms a flat part 51b that extends in a direction orthogonal to the axis L1 direction (radial direction).

The first contact part 51d that protrudes to the distal end side in the axis L1 direction is provided on the inner surface 51c facing the distal end side of the locking protrusion 51a in the axis L1 direction, and the first contact part 51d is formed in a protruded shape so as to protrude to the distal end side in the axis L1 direction. Co-rotation of the scale mark dial 72 with the knob 32 at the time of rotating operation of the knob 32 is prevented as described above by bringing the first contact parts 51d into contact with the resistance generating projections 73 of the scale body 70. A plurality of locking recesses 55 recessed radially inward is provided on the outer periphery of the spacer 50 on the proximal end side in the axis L1 direction at intervals in the circumferential direction. These locking recesses 55 are used at the time of setting the rotation of the knob 32 to a lock state.

Figure 19:
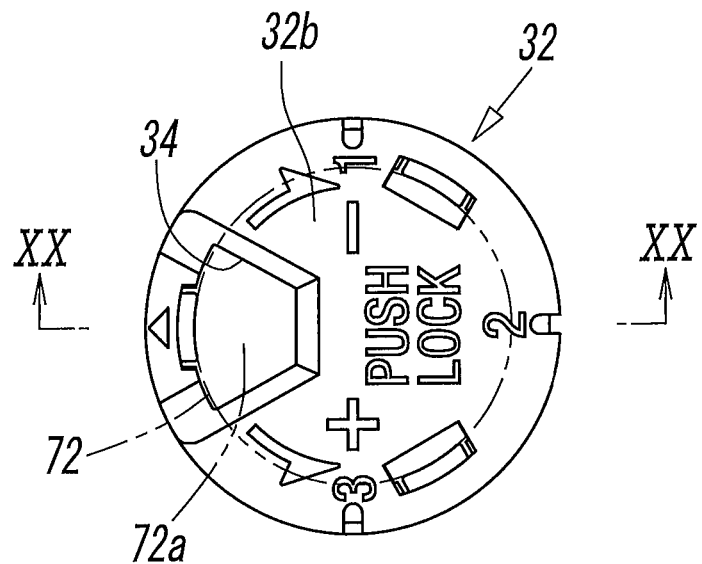
FIG. 19 is a front view of a knob shown in FIG. 5.
Figure 20:
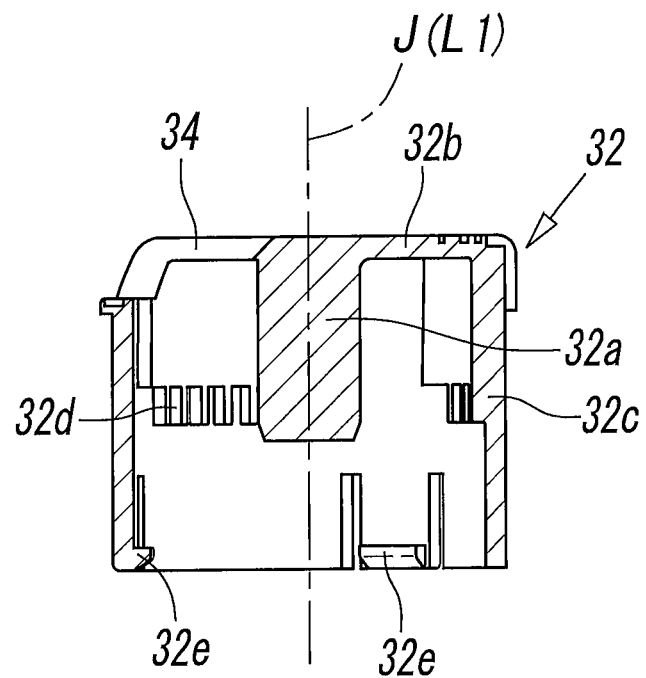
FIG. 20 is a sectional view taken along the line XX-XX in FIG. 19.

As shown in FIGS. 4, 19, and 20, the knob 32 has the top 32b extending in the radial direction, and a side 32c extending from the periphery of the top 32b to the distal end side in the axis L1 direction and formed in a cylindrical shape, and is formed in a closed-top cylindrical shape. The knob 32 is made of, for example, a synthetic resin and is preferably made of a polyacetal resin (POM resin). The knob 32 having such a mode is mounted radially outward of the spacer 50 so as to surround the proximal end side of the spacer 50 in the axis L1 direction. The engaging protrusion 32a that extends along the central axis J (that is, the axis L1) and that protrudes to the distal end side in the axis L1 direction is provided on the inner surface of the top 32b of the knob 32. The engaging protrusion 32a has a shape similar to the sectional shape of the through-hole 43 of the shaft portion 40 and is inserted in the knob insertion hole 44 (see FIG. 11) of the shaft portion 40. Therefore, as described above, the knob 32 is fixed to the shaft portion 40 around the axis L1 and rotates integrally with the shaft portion 40, while the knob 32 is movable in the axis L1 direction with respect to the shaft portion 40.

The scale reading part 34 that indicates the scale mark 72b corresponding to the rotating operation amount of the knob 32 is provided at the top 32b of the knob 32. In the present embodiment, the scale reading part 34 is a "scale reading opening" that extends through the top 32b in the axis L1 direction to be opened and has a trapezoidal shape that extends radially inward from the periphery of the top 32b. The flat part 72a of the scale mark dial 72 of the scale body 70 is exposed through the scale reading opening 34. Therefore, the scale mark 72b (see FIG. 13) on the flat part 72a can be seen through the scale reading part 34.

A plurality of engaging projections 32d that project radially inward and that extend in the axis L1 direction is provided on the inner periphery of the intermediate part of the side 32c in the axis L1 direction at equal intervals in the circumferential direction as shown in FIG. 20. When the knob 32 is moved to the distal end side in the axis L1 direction with respect to the shaft portion 40, the engaging projections 32d mesh with the locking recesses 55 (see FIG. 15) of the spacer 50 and lock the rotation of the knob 32. On the other hand, when the knob 32 is moved to the proximal end side in the axis L1 direction in a state where the engaging projections 32d are engaged with the locking recesses 55, the engaging projections 32d slip off from the locking recesses 55, and the lock state of the knob 32 in the rotation direction is released.

Here, when the engaging projections 32d mesh with the locking recesses 55 and the rotation of the knob 32 is locked, the engaging hooks 32e provided on the inner surface of the distal end of the side 32c in the axis L1 direction are locked to the annular projection 53 provided on the outer periphery of the spacer 50, and the knob 32 is held in lock position Pr, as shown in FIG. 4. On the other hand, when the knob 32 is moved from the lock position Pr to the proximal end side in the axis L1 direction, the engaging hooks 32e climb over the annular projection 53 and are locked to the step 54 provided on the proximal end side in the axis L1 direction with respect to the annular projection 53. The engaging hooks 32e locked to the step 54 are sandwiched between the step 54 and the annular projection 53, and the knob 32 is held in a non-lock state.

In this way, in the flow control valve 10 according to the present embodiment, the shaft portion 40, the scale body 70, and the spacer 50 are disposed coaxially in the axis L inside the knob 32. Therefore, in comparison with the existing one in which the central axis J of the scale body 70 is disposed at a location eccentric in the radial direction with respect to the first axis L1, the flow control valve 10 is able to be reduced in size.

As shown in FIGS. 1, 2, 3, and 4, the second body 13 is coupled to the side surface of the valve accommodating part 12a in the first body 12 so as to project radially outward of the first body 12. The second body 13 is formed in a substantially circular columnar shape from its appearance, the proximal end-side end in the second axis L2 direction (upper end side in FIG. 1) is airtightly closed, and the second port 15 is opened at the distal end-side end in the second axis L2 direction (lower end side in FIG. 1). An external thread 18 is formed on the outer periphery of the second port 15 around the axis L2. For example, the second port 15 can be screwed to the body of a pneumatic device, such as a pneumatic cylinder, and connected to a channel formed in the body.

The communication channel 19 that makes up part of the fluid channel 16 and that communicates the internal channel 16c formed in the first body 12 with the second port 15 is formed inside the second body 13. The communication channel 19 is made up of a connecting channel 19a that extends in the radial direction orthogonally to the second axis L2 in the second body 13 and that is connected to the internal channel 16c of the first body 12, and a port channel 19b that extends in the second axis L2 inside the second body 13 along the second axis L2 and of which one end is connected to the connecting channel 19a and the other end is connected to the second port 15. In other words, the port channel 19b is formed radially outward from the axis L1 at a location spaced a distance X (see FIG. 2) apart from the second axis L2.

Figure 21:
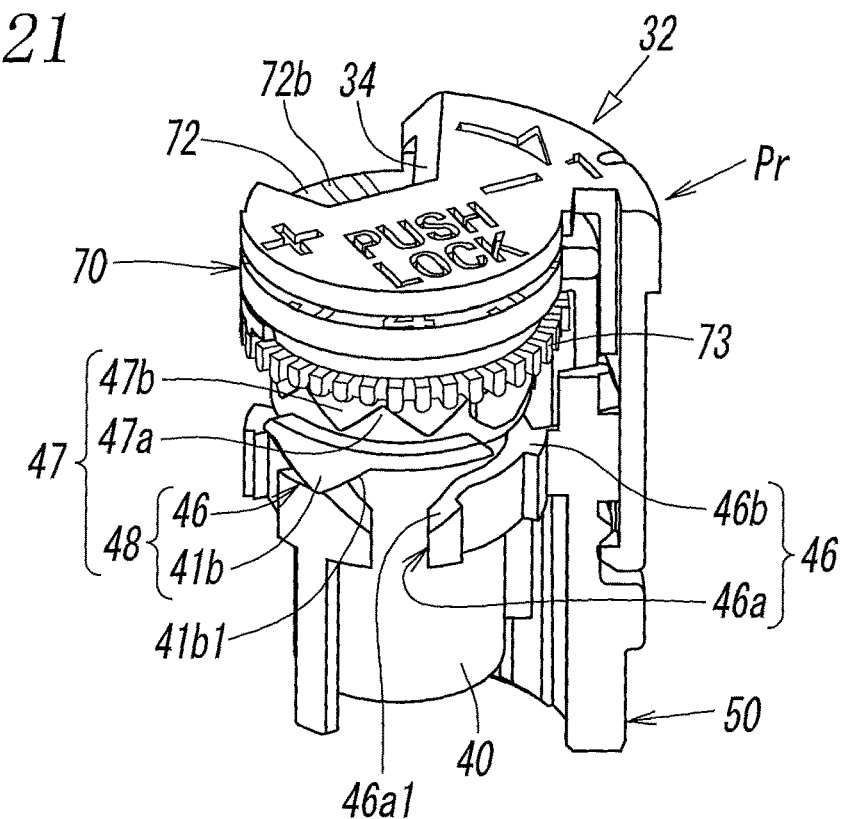
FIG. 21 is a view for illustrating the operation of a clutch mechanism shown in FIG. 5 and showing that the rotation of the knob and the scale body is in a lock state.

Next, the operation to change the scale mark 72b according to the rotating operation amount of the knob 32 will be described with reference to FIGS. 21 to 23. FIG. 21 shows a state where the knob 32 moves to the lock position Pr and the rotation of the knob 32 is restricted. In this state, the knob 32 is pressed to the distal end side in the axis L1 direction, the engaging projections 32d (see FIG. 20) of the knob 32 mesh with the locking recesses 55 (see FIG. 15) of the spacer 50, and the rotation of the knob 32 is restricted. The shaft portion 40 is urged by the urging force of the coil spring 62 (see FIG. 4) to the distal end side in the axis L1 direction, the cam copying projection 41b of the clutch drive mechanism 48 contacts the cam flat part 46b of the cam surface 46, and the meshing portion 47a and the gear portion 47b of the clutch mechanism 47 are in a meshed state.

In this state, when the lock state of the knob 32 is released by moving the knob 32 to the proximal end side in the axis L1 direction and the knob 32 is rotated in a counterclockwise direction, the knob 32 and the shaft portion 40 rotate, and the cam copying projection 41b slide on the cam flat part 46b. In this way, when the knob 32 is rotated in the counterclockwise direction (+direction of the arrow) in a state where the scale body 70 and the shaft portion 40 are fixed to each other around the axis L1, the scale body 70 and the shaft portion 40 rotate in the same direction as the knob 32, and the cam copying projection 41b of the clutch drive mechanism 48 moves toward the cam hole 46a while sliding on the cam flat part 46b.

Figure 22:
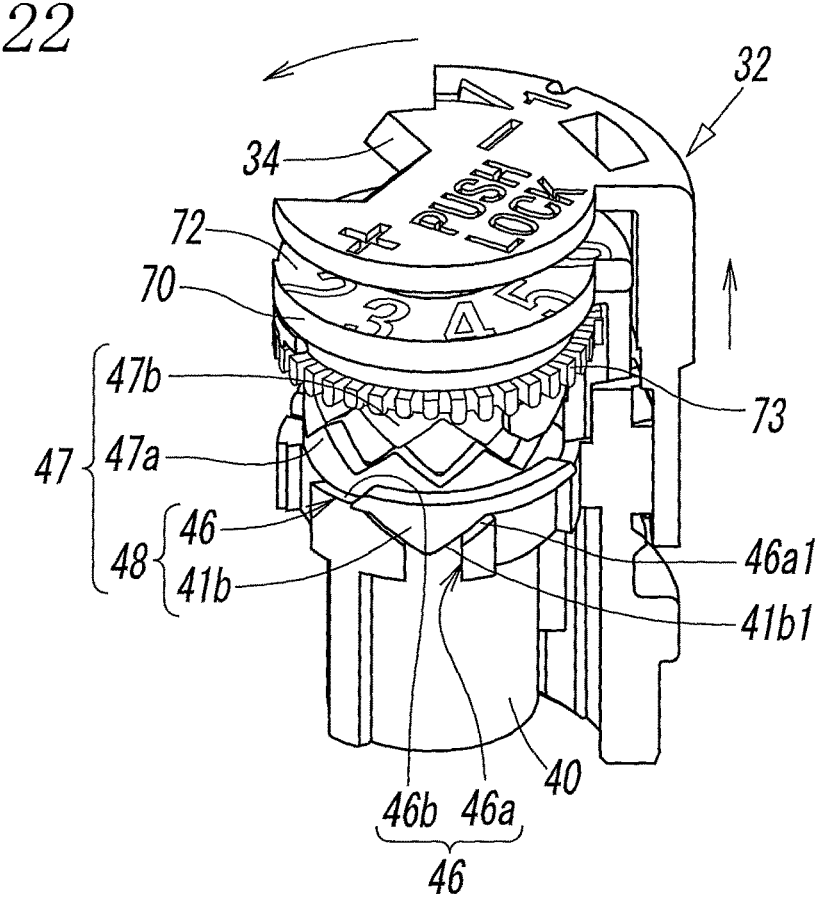
FIG. 22 is a view for illustrating the operation of the clutch mechanism shown in FIG. 5 and showing that the rotation of the knob is in a non-lock state and the rotation of the scale body is in a lock state.

As shown in FIG. 22, when the cam copying projection 41b approaches the cam hole 46a of the cam surface 46, the shaft portion 40 moves to the distal end side in the axis L1 direction by the urging force of the coil spring 62, with the result that the cam copying projection 41b moves into the cam hole 46a, and the mesh between the meshing portion 47a and the gear portion 47b is released. Therefore, the rotation of the shaft portion 40 is not transmitted to the scale body 70, and the rotation of the scale body 70 stops. In this state, when the knob 32 is further rotated, the side surface 41b1 of the cam copying projection 41b moves to the proximal end side in the axis L1 direction along the inclined surface 46a1 of the cam hole 46a against the urging force of the coil spring 62. Accordingly, the scale reading part 34 (scale reading opening) formed in the knob 32 rotationally shifts on the scale mark dial 72 of the stopped scale body 70, and the scale mark 72b indicated by the scale reading part 34 changes into the adjacent scale mark 72b. For example, in FIG. 21, the scale mark 72b indicated by the scale reading opening 34 changes from "0" to "1".

When the cam copying projection 41b slips out from the cam hole 46a and moves to a location where the cam copying projection 41b contacts the cam flat part 46b, the gear portion 47b and the meshing portion 47a of the clutch mechanism 47 are placed in a meshed state again as shown in FIG. 23, and the scale body 70 and the knob 32 are fixed to each other around the axis L. Therefore, the scale body 70 and the knob 32 rotate integrally again.

Here, when the knob 32 is swiftly rotated in the counterclockwise direction in a state where the cam copying projection 41b is engaged with the cam hole 46a, the shaft portion 40 swiftly moves to the proximal end side in the axis L1 direction by reaction force from the inclined surface 46a1 of the cam hole 46a that the side surface 41b1 of the cam copying projection 41b contacts, and the meshing portion 47a may contact the gear portion 47b to generate a sound. For this reason, a jump preventing mechanism 60 for preventing the shaft portion 40 from swiftly moving to the proximal end side in the axis L1 direction even when the knob 32 is swiftly rotated in the counterclockwise direction in a state where the cam copying projection 41b is engaged with the cam hole 46a is provided in the flow control valve 10 of the present embodiment.

Figure 24:
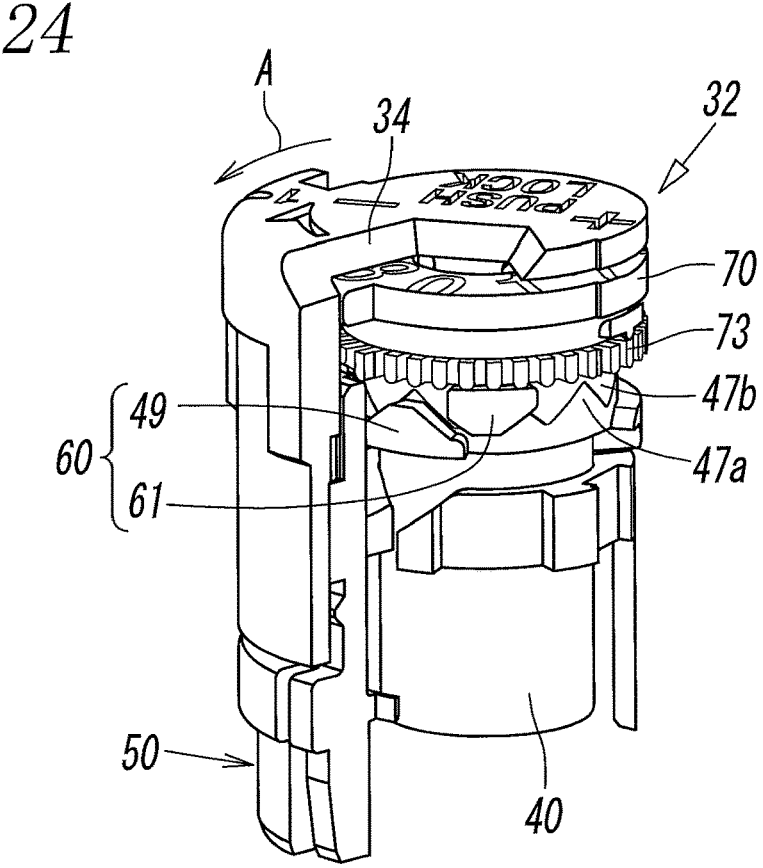
FIG. 24 is a view for preventing a jump of the shaft portion at the time of changing a scale mark and showing a case where a contact surface and a second contact part are in a non-contact state.
Figure 25:
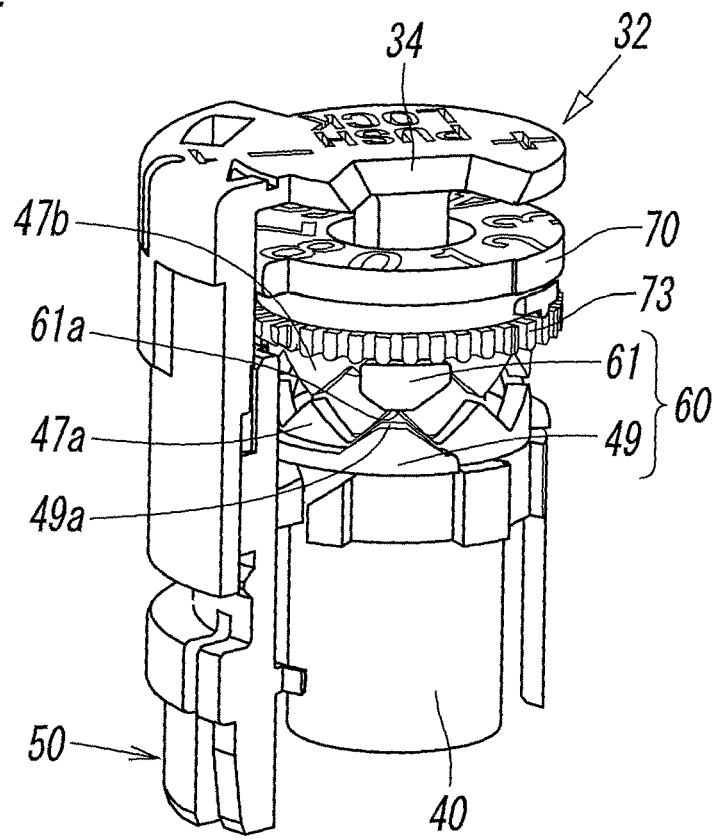
FIG. 25 is a view for preventing a jump of the shaft portion at the time of changing the scale mark and showing a case where the contact surface and the second contact part are in a contact state.
Figure 26:
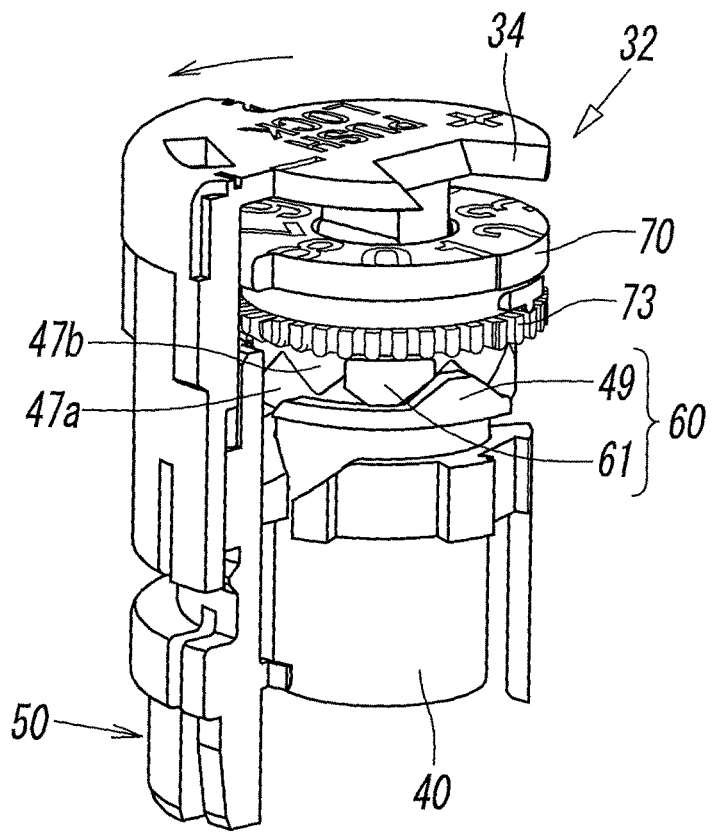
FIG. 26 is a view for preventing a jump of the shaft portion at the time of changing the scale mark and showing a case where the contact surface and the second contact part are in a non-contact state.

Next, the jump preventing mechanism 60 will be described with reference to FIGS. 21 to 26. FIG. 24 shows a partially sectional view of the flow control valve 10 shown in FIG. 21 when viewed from another angle. FIG. 25 shows a partially sectional view of the flow control valve 10 shown in FIG. 22 when viewed from another angle. FIG. 26 shows a partially sectional view of the flow control valve 10 shown in FIG. 23 when viewed from another angle.

As shown in FIG. 24, the jump preventing mechanism 60 includes the second contact part 49 provided in the above-described shaft portion 40, and the jump preventing wall 61 provided in the spacer 50. As shown in FIGS. 21 and 24, in a state where the cam copying projection 41b contacts the cam flat part 46b and the meshing portion 47a and the gear portion 47b are meshed, the second contact part 49 is located just before the jump preventing wall 61 in the circumferential direction and is not in contact with the jump preventing wall 61.

When the knob 32 is rotated in the counterclockwise direction and the cam copying projection 41b moves into the cam hole 46a of the cam surface 46 as shown in FIGS. 22 and 25, the second contact part 49 moves to just below the distal end side of the jump preventing wall 61 in the axis L1 direction. In this state, the flat part 49a of the second contact part 49 is disposed close to and opposite the contact surface 61a of the jump preventing wall 61, and the meshing portion 47a and the gear portion 47b are in a non-engaged state of being spaced apart from each other.

Therefore, in a state where the cam copying projection 41b is engaged with the cam hole 46a, when the knob 32 is swiftly rotated in the counterclockwise direction and the shaft portion 40 moves to the proximal end side in the axis L1 direction, the flat part 49a of the second contact part 49 contacts the contact surface 61a of the jump preventing wall 61, so further movement of the shaft portion 40 to the proximal end side in the axis L1 direction is blocked, and a situation in which the meshing portion 47a and the gear portion 47b contact is prevented. Thus, a sound generated by the contact of the meshing portion 47a with the gear portion 47b is prevented.

In a state where the second contact part 49 and the jump preventing wall 61 are disposed close to and opposite each other, when the knob 32 is further rotated in the counterclockwise direction, the second contact part 49 moves to a deep side of the jump preventing wall 61 in the circumferential direction, and the meshing portion 47a and the gear portion 47b are re-engaged as shown in FIG. 26.

In this way, in the flow control valve 10 according to the present embodiment, the knob 32 formed in a top-closed cylindrical shape, the scale body 70, the clutch mechanism 47 for changing the scale body 70, and the spacer 50 are disposed coaxially in the axis L1. Therefore, in comparison with the existing one in which the central axis J of the scale body 70 is disposed at a location eccentric in the radial direction with respect to the axis L1, for example, the radial size of the first body 12 can be further reduced, so the flow control valve 10 is able to be further reduced in size.

Figure 27:
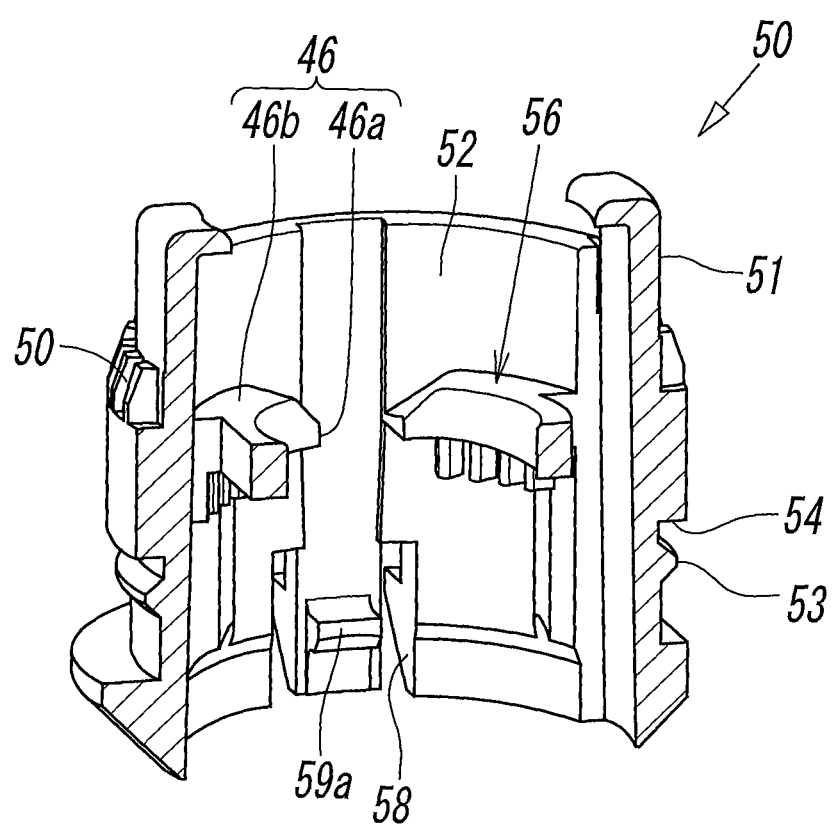
FIG. 27 is a relevant part sectional view showing a modification of the spacer.

FIG. 27 shows a modification of the spacer 50 of the above-described flow control valve 10. In the above-described embodiment, as shown in FIG. 17, the case where the cam holes 46a, 46a are provided on both sides of the collar 56 of the spacer 50 in the radial direction via the central axis J has been described. In this case, since the scale mark 72b changes each time the knob 32 is rotated by 180 degrees, the scale mark does not coincide with the number of revolutions of the knob. For this reason, as shown in FIG. 27, when the cam hole 46a is provided at only one location in the collar 56, the scale mark 72b can be changed each time the knob 32 rotates 360 degrees, that is, each time the knob 32 rotates one revolution. Thus, it is possible to bring the number of revolutions of the knob 32 and the scale mark 72b into coincide with each other.

In the above-described embodiment, the case where the scale reading part 34 that indicates the scale mark 72b is the scale reading opening opened at the top 32b of the knob 32 has been described; however, the scale reading part 34 is not limited thereto and may be, for example, an arrow or the like. In addition, numbers of the scale marks 72b also do not need to indicate the numbers of times the knob 32 is rotated by 180 degrees like the present embodiment, and may be, for example, numbers that indicate the rotating operation amounts of the knob 32, corresponding to the opening degrees of the needle valve 27 by equally dividing the opening degree of the needle valve 27 by an integer.

In the above-described embodiment, the clutch drive mechanism 48 has been described as an axial drive means for actuating the shaft portion 40 in the axis L1 direction; however, the clutch drive mechanism 48 is not limited thereto, and various drive means may be adopted.

REFERENCE SIGNS LIST 10 flow control valve
12 first body (body)
12a valve accommodating part
12b port forming part
13 second body
14 first port
15 second port
16 fluid channel
16a first channel
16b second channel (channel)
16c internal channel
17 fitting
17a locking piece
17b release bush
18, 30 external thread
19 communication channel
19a connecting channel
19b port channel
20 check valve holder
20a recess
21 needle valve holder
21a valve hole
21b fixing hole part
21b1 first fixing surface part
21b2 second fixing surface part
21c circumferential wall
21d, 21d' step
22 center hole
23 seal
25 check valve
26 seat
27 needle valve
27a throttle part
27b needle body
27c cutout surface
28 valve seal
29 throttle hole
31 needle guide
31a internal thread
31b, 43 through-hole
32 knob
32a engaging protrusion
32b top
32c side 32d engaging projection
32e engaging hook
33, 51a locking protrusion
34 scale reading part (scale reading opening)
40 shaft portion
41 first shaft part
41a urging flange
41b cam copying projection
41b1 side surface
42 second shaft part
42a side wall
42a1 flat part
42a2, 44b, 45b curved part
42b space
42c step
44 knob insertion hole
44a proximal end second flat part
45 needle valve insertion hole
45a proximal end first flat part
46 cam surface
46a cam hole
46a1 inclined surface
46b cam flat part
47 clutch mechanism
47a meshing portion (engaging portion)
47a' meshing piece
47b gear portion (engaged portion)
47b' gear piece
48 clutch drive mechanism
49 second contact part
50 spacer
51 locking hook
51a locking protrusion
51b flat part
51c inner surface
51b, 72a flat part
51d first contact part
52 through-hole
52a small-diameter part
53 annular projection
54, 54' step
55 locking recess
56 collar
57 fixing piece
57a first surface
57b second surface
58 opening
59 leg
59a locking projection
60 jump preventing mechanism
61 jump preventing wall
61a contact surface
62 coil spring (spring)
70 scale body
71 ring body
71a recess
71b spring seat
72 scale mark dial
72b scale mark
73 resistance generating projection
74 ring hole
A arrow
J central axis
L1 first axis
L2 second axis
Pr lock position

The invention claimed is:

1. A flow control valve comprising:
a body extending in an axial direction;
a channel formed in the body;
a knob disposed on one side of the body in the axial direction and supported so as to be rotatable around the axis with respect to the body; and
a needle valve that is disposed coaxially with the knob in the body and that adjusts an opening degree of the channel by moving in the axial direction in accordance with a rotating operation amount of the knob, wherein
the flow control valve is capable of controlling a flow rate of fluid flowing through the channel in accordance with the rotating operation amount of the knob,
the flow control valve further comprising:
a scale body supported so as to be rotatable around the axis with respect to the knob and having scale marks that indicate rotating operation amounts of the knob;
a scale reading part that rotates constantly integrally with the knob around the axis and that indicates the scale mark corresponding to the rotating operation amount of the knob;
a shaft portion that is disposed on an other side of the scale body in the axial direction and that rotates constantly integrally with the knob around the axis while being supported so as to be movable in the axial direction with respect to the knob; and
a clutch mechanism that switches the scale mark of the scale body, indicated by the scale reading part, each time the knob is rotated by a predetermined angle by transmitting rotation of the knob to the scale body or interrupting the transmission, wherein
the clutch mechanism includes
an engaging portion and an engaged portion, one of which is provided on the shaft portion and the other one of which is provided on the scale body, and that rotate the scale reading part and the scale body integrally around the axis by transmitting rotation of the knob to the scale body through engagement with each other, and
a clutch drive mechanism that permits the scale reading part to rotate around the axis with respect to the scale body through rotation of the knob by moving the shaft portion to the other side in the axial direction each time the knob is rotated by a predetermined angle to release engagement between the engaging portion and the engaged portion and that, after the scale mark of the scale body, indicated by the scale reading part, is changed through the rotation of the scale reading part with respect to the scale body, re-engages the engaging portion with the engaged portion.

2. The flow control valve according to claim 1, wherein the clutch drive mechanism includes
a cam surface provided so as to be fixed to the body and extending annularly around the axis, and
a cam copying projection that is provided on the shaft portion and disposed opposite the cam surface and that rotates around the axis to slide on the cam surface with rotation of the knob,
the cam surface has
a cam hole extending through in the axial direction, and
a cam flat part extending in a planar shape from one-side end of the cam hole in the axial direction so as to face one side in the axial direction, and
the clutch drive mechanism releases engagement between the engaged portion and the engaging portion by the cam copying projection moving into and engaging with the cam hole each time the knob is rotated by a predetermined angle, and permits rotation of the scale reading part around the axis with respect to the scale body through rotation of the knob.

3. The flow control valve according to claim 2, wherein the clutch drive mechanism includes a spring that constantly urges the shaft portion toward the other side in the axial direction, the shaft portion moves to the other side in the axial direction with movement of the cam copying projection into the cam hole under urging of the spring, and, after the scale mark of the scale body, indicated by the scale reading part, is changed, the engaged portion and the engaging portion are re-engaged by the cam copying projection moving to one side in the axial direction against the urging of the spring to contact the cam flat part.

4. The flow control valve according to claim 3, wherein the scale body includes a plurality of resistance generating projections provided around the axis at intervals, the flow control valve comprises a locking protrusion that slidably contacts the plurality of resistance generating projections, the locking protrusion is disposed on any one side in the axial direction with respect to the plurality of resistance generating projections and provided so as to be fixed to the body, and in a state where engagement between the engaged portion and the engaging portion is released, co-rotation of the scale body with rotation of the knob is blocked by resistance generated when the locking protrusion contacts any one of the plurality of resistance generating projections.

5. The flow control valve according to claim 4, wherein the locking protrusion has a first contact part that protrudes toward the other side in the axial direction and that slidably contacts the resistance generating projection, and the plurality of resistance generating projections extends radially outward in a radial direction at equal intervals around the axis.

6. The flow control valve according to claim 3, wherein the flow control valve has a contact surface that is provided so as to be fixed to the body and that faces the other side in the axial direction, the shaft portion has a second contact part that is disposed opposite the contact surface and that is able to contact the contact surface, and the second contact part, when the cam copying portion is removed from the cam hole through rotating operation of the knob in a state where the cam copying portion is engaged with the cam hole, contacts the contact surface to block movement of the shaft portion to one side in the axial direction.

7. The flow control valve according to claim 2, wherein the scale body includes a plurality of resistance generating projections provided around the axis at intervals, the flow control valve comprises a locking protrusion that slidably contacts the plurality of resistance generating projections, the locking protrusion is disposed on any one side in the axial direction with respect to the plurality of resistance generating projections and provided so as to be fixed to the body, and in a state where engagement between the engaged portion and the engaging portion is released, co-rotation of the scale body with rotation of the knob is blocked by resistance generated when the locking protrusion contacts any one of the plurality of resistance generating projections.

8. The flow control valve according to claim 7, wherein the locking protrusion has a first contact part that protrudes toward the other side in the axial direction and that slidably contacts the resistance generating projection, and the plurality of resistance generating projections extends radially outward in a radial direction at equal intervals around the axis.

9. The flow control valve according to claim 2, wherein the flow control valve has a contact surface that is provided so as to be fixed to the body and that faces the other side in the axial direction, the shaft portion has a second contact part that is disposed opposite the contact surface and that is able to contact the contact surface, and the second contact part, when the cam copying portion is removed from the cam hole through rotating operation of the knob in a state where the cam copying portion is engaged with the cam hole, contacts the contact surface to block movement of the shaft portion to one side in the axial direction.

* * * * *